United States Patent
Somaiya et al.

(10) Patent No.: US 11,055,761 B2
(45) Date of Patent: Jul. 6, 2021

(54) SYSTEMS AND METHODS FOR DETERMINING DYNAMIC PRICE RANGES

(71) Applicant: eBay Inc., San Jose, CA (US)

(72) Inventors: Manas Haribhai Somaiya, Sunnyvale, CA (US); Nirveek De, Mountain View, CA (US)

(73) Assignee: eBay Inc., San Jose, CA (US)

(*) Notice: Subject to any disclaimer, the term of this patent is extended or adjusted under 35 U.S.C. 154(b) by 616 days.

(21) Appl. No.: 14/448,107

(22) Filed: Jul. 31, 2014

(65) Prior Publication Data
US 2016/0019619 A1    Jan. 21, 2016

Related U.S. Application Data

(60) Provisional application No. 62/025,918, filed on Jul. 17, 2014.

(51) Int. Cl.
*G06Q 30/06* (2012.01)
*G06F 16/951* (2019.01)

(52) U.S. Cl.
CPC ....... *G06Q 30/0625* (2013.01); *G06F 16/951* (2019.01)

(58) Field of Classification Search
None
See application file for complete search history.

(56) References Cited

U.S. PATENT DOCUMENTS

| | | | | |
|---|---|---|---|---|
| 7,149,717 B1* | 12/2006 | Kan | ...... | G06Q 30/00 705/37 |
| 7,165,091 B2* | 1/2007 | Lunenfeld | ...... | G06Q 30/0601 709/203 |
| 7,376,613 B1* | 5/2008 | Cofino | ...... | G06Q 20/10 705/26.3 |
| 7,497,369 B2* | 3/2009 | Dalzell | ...... | G06Q 30/02 235/375 |
| 7,637,426 B1* | 12/2009 | Green | ...... | G06Q 30/06 235/383 |

(Continued)

OTHER PUBLICATIONS

"Quantile", Wikipedia, [Online]. Retrieved from the Internet: <URL: http://en.wikipedia.org/wiki/Quantile>, (Accessed Jul. 16, 2014), 5 pgs.

*Primary Examiner* — Amresh Singh
(74) *Attorney, Agent, or Firm* — Shook, Hardy & Bacon L.L.P.

(57) ABSTRACT

This disclosure provides systems and methods of determining price quantiles for associated search queries and displaying said price quantiles when one or more search queries are received. In various embodiments, a search query for an item offered for sale may be received. Search results from a plurality of offered items may be determined based on the search query. The search results may each be associated with a price. The search results may be displayed, and a selection of a search result may be received. The price of the selected search result may be associated with the received search query. Various price quantiles may be determined based on the associated price(s). In addition, the price quantiles may each include prices associated with the search results. The determined price quantiles may then be displayed in response to a second search query determined to be related to the first search query.

20 Claims, 16 Drawing Sheets

(56) References Cited

U.S. PATENT DOCUMENTS

| | | | | |
|---|---|---|---|---|
| 7,895,080 B2* | 2/2011 | Haynes | G06Q 30/06 | |
| | | | 705/26.4 | |
| 7,945,507 B2 | 5/2011 | Cottrel | | |
| 8,027,910 B2 | 9/2011 | Ebersole et al. | | |
| 8,050,982 B2 | 11/2011 | Lin | | |
| 8,055,548 B2* | 11/2011 | Staib | G06Q 10/107 | |
| | | | 705/26.1 | |
| 8,145,544 B2 | 3/2012 | Leal | G06Q 30/02 | |
| | | | 705/26.1 | |
| 8,161,072 B1* | 4/2012 | Pfleger | G06F 16/248 | |
| | | | 707/791 | |
| 8,374,907 B1 | 2/2013 | Choi et al. | | |
| 8,533,054 B1* | 9/2013 | Haney | G06Q 30/06 | |
| | | | 705/26.1 | |
| 8,630,920 B2* | 1/2014 | Dumon | G06Q 30/02 | |
| | | | 705/26.7 | |
| 8,676,641 B2* | 3/2014 | Postrel | G06Q 30/02 | |
| | | | 705/14.23 | |
| 8,972,287 B1* | 3/2015 | Mesaros | G06Q 30/06 | |
| | | | 705/26.4 | |
| 9,262,784 B2* | 2/2016 | Shi | G06Q 30/0603 | |
| 9,286,412 B2* | 3/2016 | Maslovskis | G06Q 30/0623 | |
| 9,338,630 B2* | 5/2016 | Kim | H04W 4/24 | |
| 9,489,400 B1* | 11/2016 | Haitani | G06F 17/30247 | |
| 10,025,866 B2* | 7/2018 | Baker | G06F 3/04847 | |
| 10,185,917 B2* | 1/2019 | Greystoke | G06Q 30/0619 | |
| 2003/0090524 A1* | 5/2003 | Segerberg | H04N 21/482 | |
| | | | 715/786 | |
| 2003/0171999 A1* | 9/2003 | Shishido | G06Q 30/0625 | |
| | | | 705/26.62 | |
| 2004/0039598 A1* | 2/2004 | Kim | G06Q 30/0201 | |
| | | | 705/26.1 | |
| 2006/0064411 A1* | 3/2006 | Gross | G06F 16/90324 | |
| 2006/0095345 A1* | 5/2006 | Ka | G06Q 30/0641 | |
| | | | 705/26.62 | |
| 2006/0224406 A1* | 10/2006 | Leon | H04L 67/42 | |
| | | | 705/26.1 | |
| 2006/0224960 A1* | 10/2006 | Baird-Smith | G06F 3/04842 | |
| | | | 715/700 | |
| 2006/0271475 A1* | 11/2006 | Brumfield | G06Q 30/08 | |
| | | | 705/39 | |
| 2007/0073641 A1* | 3/2007 | Perry | G06F 16/335 | |
| 2008/0005118 A1* | 1/2008 | Shakib | G06F 16/951 | |
| 2008/0086451 A1* | 4/2008 | Torres | G06F 16/951 | |
| 2009/0043759 A1* | 2/2009 | Danish | G06Q 30/0208 | |
| 2009/0287657 A1* | 11/2009 | Bennett | G06F 16/9535 | |
| 2009/0327267 A1* | 12/2009 | Wong | G06F 16/3349 | |
| 2010/0076960 A1* | 3/2010 | Sarkissian | G06F 16/9535 | |
| | | | 707/722 | |
| 2010/0262596 A1* | 10/2010 | Dumon | G06Q 30/0623 | |
| | | | 707/723 | |
| 2010/0262602 A1* | 10/2010 | Dumon | G06Q 30/02 | |
| | | | 707/728 | |
| 2011/0093494 A1* | 4/2011 | Chandler | G06F 3/0484 | |
| | | | 707/769 | |
| 2011/0145163 A1* | 6/2011 | Kurra | G06Q 30/0282 | |
| | | | 705/347 | |
| 2011/0173032 A1* | 7/2011 | Payne | G06Q 10/02 | |
| | | | 705/5 | |
| 2011/0184883 A1* | 7/2011 | El-Charif | G06F 16/24578 | |
| | | | 705/348 | |
| 2011/0213678 A1* | 9/2011 | Chorney | G06Q 30/0601 | |
| | | | 705/26.61 | |
| 2011/0295716 A1* | 12/2011 | Dumon | G06Q 30/02 | |
| | | | 705/26.61 | |
| 2012/0059732 A1 | 3/2012 | Dakka et al. | | |
| 2012/0117047 A1* | 5/2012 | Xu | G06F 16/951 | |
| | | | 707/706 | |
| 2012/0123910 A1* | 5/2012 | George | G06Q 30/0641 | |
| | | | 705/27.1 | |
| 2012/0239535 A1* | 9/2012 | Leal | G06Q 30/02 | |
| | | | 705/26.64 | |
| 2012/0239545 A1 | 9/2012 | Kemp, II et al. | | |
| 2012/0284164 A1 | 11/2012 | Ram et al. | | |
| 2012/0290386 A1* | 11/2012 | Skinner | G06Q 30/0247 | |
| | | | 705/14.46 | |
| 2012/0323822 A1 | 12/2012 | Wei | | |
| 2012/0330812 A1* | 12/2012 | Bouchard | G06Q 40/04 | |
| | | | 705/37 | |
| 2013/0073323 A1* | 3/2013 | Zacharia | G06Q 10/025 | |
| | | | 705/5 | |
| 2013/0104063 A1* | 4/2013 | Legris | G06F 3/0484 | |
| | | | 715/765 | |
| 2013/0197971 A1* | 8/2013 | Wilke | G06Q 30/0202 | |
| | | | 705/7.31 | |
| 2013/0238398 A1 | 9/2013 | Rothman | | |
| 2013/0268515 A1* | 10/2013 | Maslovskis | G06F 16/9038 | |
| | | | 707/722 | |
| 2013/0339215 A1 | 12/2013 | Lutnick et al. | | |
| 2014/0019210 A1 | 1/2014 | Beltran Guerrero et al. | | |
| 2014/0067564 A1 | 3/2014 | Yuan et al. | | |
| 2014/0108218 A1 | 4/2014 | Ram et al. | | |
| 2014/0108227 A1 | 4/2014 | Helweg | | |
| 2014/0114792 A1 | 4/2014 | Smith et al. | | |
| 2014/0129363 A1 | 5/2014 | Lorah et al. | | |
| 2014/0181136 A1* | 6/2014 | Johnson | G06F 16/285 | |
| | | | 707/768 | |
| 2014/0188765 A1* | 7/2014 | Forsythe | G06Q 40/06 | |
| | | | 705/36 R | |
| 2014/0207634 A1* | 7/2014 | Edmonds | G06Q 40/025 | |
| | | | 705/31 | |
| 2014/0310066 A1* | 10/2014 | Etzioni | G06Q 40/04 | |
| | | | 705/7.35 | |
| 2014/0324665 A1* | 10/2014 | Kemp, II | G06Q 40/04 | |
| | | | 705/37 | |
| 2014/0324807 A1* | 10/2014 | Wen | G06F 16/951 | |
| | | | 707/706 | |
| 2015/0004933 A1* | 1/2015 | Kim | G06Q 30/04 | |
| | | | 455/407 | |

\* cited by examiner 120 and 122

| Publication Application 200 | Auction Application(s) 202 | Fixed-Price Application(s) 204 |

| Store Application(s) 206 | Reputation Application(s) 208 | Personalization Application(s) 210 |

| Internationalization Application(s) 212 | Navigation Application(s) 214 | Imaging Application(s) 216 |

| Listing Creation (Seller) Application(s) 218 | Listing Management (Seller) Application(s) 220 | Post-Listing Management Application(s) 222 |

| Dispute Resolution Application(s) 224 | Fraud Prevention Application(s) 226 | Messaging Application(s) 228 |

| Merchandizing Application(s) 230 | Loyalty Promotion Application(s) 232 |

*FIG. 2*

SYSTEMS AND METHODS FOR DETERMINING DYNAMIC PRICE RANGES

CROSS-REFERENCE TO RELATED APPLICATIONS

The present application claims the benefit of priority to U.S. patent application Ser. No. 62/025,918, filed Jul. 17, 2014, titled "Systems and Methods for Determining Dynamic Price Ranges," the disclosure of which is incorporated by reference herein.

TECHNICAL FIELD

The present application relates generally to the technical field of data processing and, in particular, to determine price quantiles associated with various search queries, and displaying said determined price quantiles in response to receiving one or more of the various search queries.

BACKGROUND

An electronic marketplace may offer a wide variety of items and/or services for sale. The electronic marketplace may be accessed using a web browser, such as Google Chrome, Mozilla Firefox, Microsoft Internet Explorer, and other such web browsers. The electronic marketplace may accept search queries via the web browser to help a user find a particular offered item, such as a good or service. In response, the electronic marketplace may display a set of search results that match, and/or are related to, the received search query. However, the set of search results may be extremely long, and manually searching through the set of search results may be time-consuming and exhaustive. Furthermore, the user may have a particular price in mind that he or she is willing to pay for the searched item, and the electronic marketplace may have no meaningful way in which for the user to quickly view which items are in his or her price range.

BRIEF DESCRIPTION OF THE DRAWINGS

Some embodiments of the present disclosure are illustrated by way of example and not limitation in the figures of the accompanying drawings, in which like reference numbers indicate similar elements, and in which:

FIG. 2 illustrates exemplary applications executable by one or more application servers according to aspects of the disclosure.

DETAILED DESCRIPTION

Figure 1:
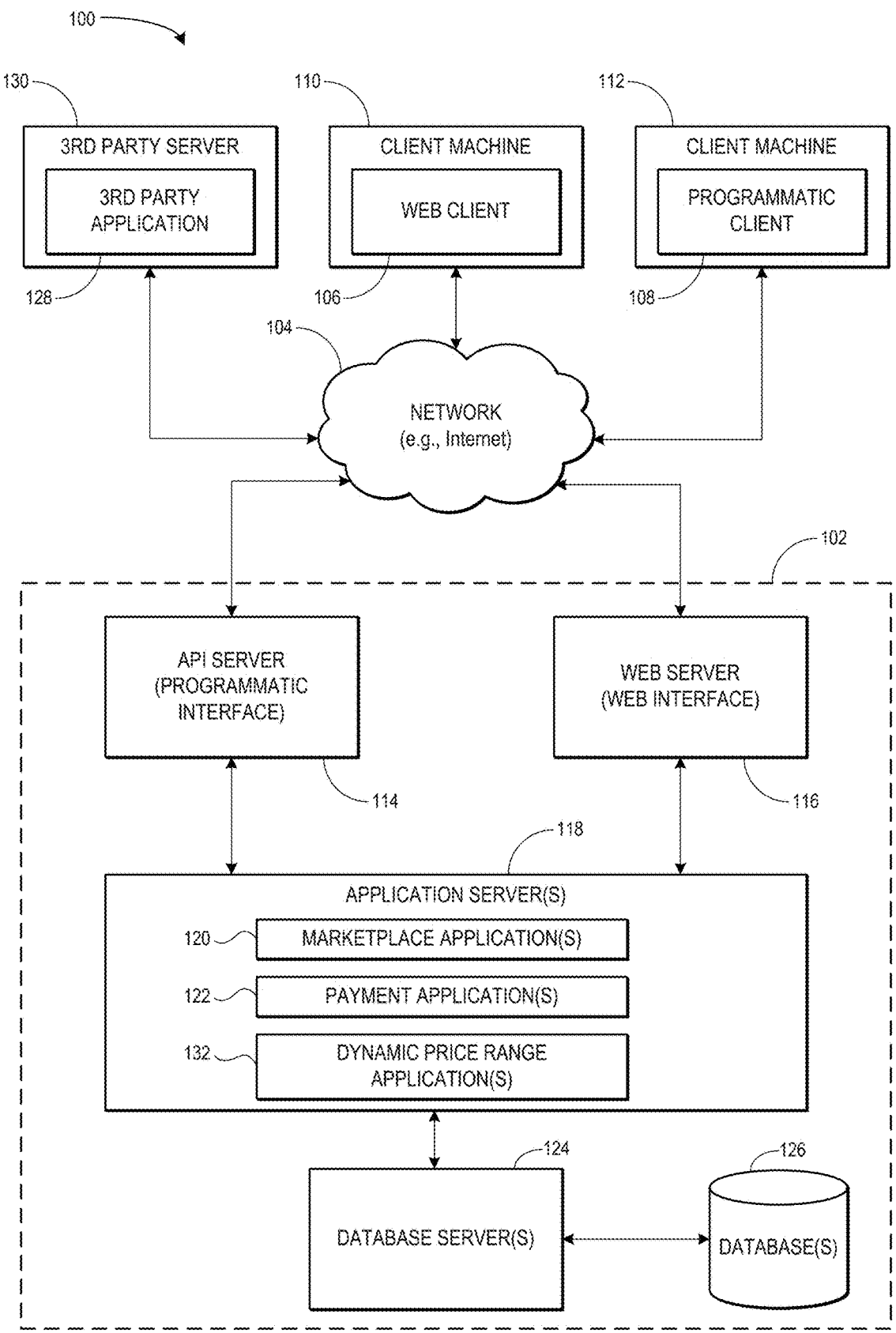
FIG. 1 illustrates a network architecture of an exemplary system according to aspects of the disclosure.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

The present disclosure is directed to systems and methods for displaying price quantiles of offered items when a search query is received. One of the challenges in offering items for sale through an electronic marketplace is that users may have specific price points or ranges in mind when searching for a good and/or service. When a user is presented with a large assortment of offered goods and/or services, the user may have to use a considerable amount of time and energy to find goods and/or services that are within his or her price range. Furthermore, with the large assortment of goods and/or services that may be available through the electronic marketplace, it may be technically difficult to display all of the various prices at which the goods and/or services are offered. Thus, the present disclosure provides an advantageous system and methodology for determining the price ranges to display when given a search query from the user, and for presenting a meaningful display of those price ranges when they are determined.

Accordingly, in one embodiment, a computer-implemented method is disclosed that may include receiving, by a network interface, a first search query for an item offered for sale through an electronic marketplace and determining, by one or more processors in communication with the network interface, a first plurality of search results from a plurality of offered items based on the received first search query, wherein the first plurality of search results are each associated with a price. The method may also include sending the determined first plurality search results to a client machine for display and receiving a selection of at least one search result selected from the first plurality of search results. The method may further include associating the price of the selected at least one search result with the received first search query and determining a plurality of price quantiles for the received first search query based on the associated price, the plurality of price quantiles each comprising at least one price associated with an item selected from the first plurality of search results. Finally, the method may include sending one or more price ranges for display by the client machine in response to a second search query determined to be related to the first search query, the one or more price ranges based on at least one price quantile from the plurality of price quantiles.

In another embodiment of the disclosed method, the method may include determining whether the selected at least one search result is being offered as an auction item or as a fixed price item, and when the selected at least one search result is being offered as an auction item, monitoring an auction of the at least one search result and performing the association of the price of the selected at least one search result with the received first search query when the auction closes.

In a further embodiment of the disclosed method, the method may include assigning a weighting factor to the association of the price of the selected at least one search result with the received first search query based on whether the selected at least one search result is being offered as an auction item or as a fixed price item, wherein the weighting factor affects the determining of the plurality of price quantiles.

In yet another embodiment of the disclosed method, the first search query is received during a session of use of the electronic marketplace, and associating the price of the selected at least one search result with the received first search query is performed when it is determined that the selected at least one search result was purchased during the same session of use of the electronic marketplace.

In yet a further embodiment of the disclosed method, the method may include sending a plurality of filter values that narrow the scope of the first plurality of search results into a second plurality of search results and receiving a selection of at least one filter value from the plurality of filter values, wherein associating the price of the selected at least one search result with the received first search query is based on the received selection of the at least one filter value.

In another embodiment of the disclosed method, the method may include determining a second plurality of search results from the plurality of offered items based on the received first search query, wherein the second plurality of search results comprise at least one item previously sold through the electronic marketplace, and associating a price of at least one search result selected from the second plurality of search results with the received first search query, wherein determining a plurality of price quantiles for the received search query comprises determining the plurality of price quantiles based on the association between the price and the at least one search result selected from the second plurality of search results.

In a further embodiment of the disclosed method, the method may include providing the received first search query to an application programming interface ("API") for another electronic marketplace, and receiving a second plurality of search results via the API for the another electronic marketplace, wherein at least one price is associated with at least one search result selected from the second plurality of search results. The method may also include associating the at least one price with the received first search query, wherein determining the plurality of price quantiles for the received first search query is further based on the association between the received first search query and the at least one price from the second plurality of search results.

In yet another embodiment of the disclosed method, the method may include determining a number of offered items that correspond to each price quantile selected from the plurality of price quantiles, and merging a given price quantile with another price quantile based on a comparison of the determined number of offered items for the given price quantile with an item threshold representing a minimum number of offered items expected for the given price quantile.

This disclosed also provides for a system that may include a non-transitory, computer-readable medium storing computer-executable instructions, and one or more processors that, having executed computer-executable instructions, are configured to receive a first search query for an item offered for sale through an electronic marketplace and determine a first plurality of search results from a plurality of offered items based on the received first search query, wherein the first plurality of search results are each associated with a price. The one or more processors may be further configured to send the determined first plurality search results to a client machine for display, and receive a selection of at least one search result selected from the first plurality of search results. The one or more processors may also associate the price of the selected at least one search result with the received first search query, and determine a plurality of price quantiles for the received first search query based on the associated price, the plurality of price quantiles each comprising at least one price associated with an item selected from the first plurality of search results. The one or more processors may be further configured to send one or more price ranges for display by the client machine in response to a second search query determined to be related to the first search query, the one or more price ranges based on at least one price quantile from the plurality of price quantiles.

In another embodiment of the disclosed system, the one or more processors may be further configured to determine whether the selected at least one search result is being offered as an auction item or as a fixed price item, and when the selected at least one search result is being offered as an auction item, monitor an auction of the at least one search result and performing the association of the price of the selected at least one search result with the received first search query when the auction closes.

In a further embodiment of the disclosed system, one or more processors may be further configured to assign a weighting factor to the association of the price of the selected at least one search result with the received first search query based on whether the selected at least one search result is being offered as an auction item or as a fixed price item, wherein the weighting factor affects the determining of the plurality of price quantiles.

In yet another embodiment of the disclosed system, the first search query is received during a session of use of the electronic marketplace, and the one or more processors may be configured to associate the price of the selected at least one search result with the received first search query when it is determined that the selected at least one search result was purchased during the same session of use of the electronic marketplace.

In yet a further embodiment of the disclosed system, the one or more processors may be further configured to send a plurality of filter values that narrow the scope of the first plurality of search results into a second plurality of search results, and receive a selection of at least one filter value from the plurality of filter value, wherein the one or more processors are further configured to associate the price of the selected at least one search result with the received first search query based on the received selection of the at least one filter value.

In another embodiment of the disclosed system, the one or more processors may be further configured to determine a second plurality of search results from the plurality of offered items based on the received first search query, wherein the second plurality of search results comprise at least one item previously sold through the electronic marketplace, and associate a price of at least one search result selected from the second plurality of search results with the received first search query. In addition, the one or more processors may be configured to determine the plurality of price quantiles for the received search query based on the association between the price and the at least one search result selected from the second plurality of search results.

In a further embodiment of the disclosed system, the one or more processors may be further configured to provide the received first search query to an application programming interface ("API") for another electronic marketplace, and receive a second plurality of search results via the API for the another electronic marketplace, wherein at least one price is associated with at least one search result selected from the second plurality of search results. The one or more processors may be further configured to associate the at least one price with the received first search query, and determine the plurality of price quantiles for the received first search query further based on the association between the received first search query and the at least one price from the second plurality of search results.

In yet another embodiment of the disclosed system, the one or more processors may be further configured to determine a number of offered items that correspond to each price quantile selected from the plurality of price quantiles, and merge a given price quantile with another price quantile based on a comparison of the determined number of offered items for the given price quantile with an item threshold representing a minimum number of offered items expected for the given price quantile.

This disclosure further provides for a non-transitory machine-readable storage medium storing a set of instructions that, when executed by at least one processor, causes the at least one processor to perform a method, where the method may include receiving, by a network interface, a first search query for an item offered for sale through an electronic marketplace, and determining, by one or more processors in communication with the network interface, a first plurality of search results from a plurality of offered items based on the received first search query, wherein the first plurality of search results are each associated with a price. The method may also include sending the determined first plurality search results to a client machine for display, and receiving a selection of at least one search result selected from the first plurality of search result. The method may further include associating the price of the selected at least one search result with the received first search query, and determining a plurality of price quantiles for the received first search query based on the associated price, the plurality of price quantiles each comprising at least one price associated with an item selected from the first plurality of search results. Finally, the method may include sending one or more price ranges for display by the client machine in response to a second search query determined to be related to the first search query, the one or more price ranges based on at least one price quantile from the plurality of price quantiles.

In another embodiment of the non-transitory, computer-readable medium, the method may further include determining whether the selected at least one search result is being offered as an auction item or as a fixed price item, and when the selected at least one search result is being offered as an auction item, monitoring an auction of the at least one search result and performing the association of the price of the selected at least one search result with the received first search query when the auction closes.

In a further embodiment of the non-transitory, computer-readable medium, the method may further include assigning a weighting factor to the association of the price of the selected at least one search result with the received first search query based on whether the selected at least one search result is being offered as an auction item or as a fixed price item, wherein the weighting factor affects the determining of the plurality of price quantiles.

In yet another embodiment of the non-transitory, computer-readable medium, the first search query may be received during a session of use of the electronic marketplace, and associating the price of the selected at least one search result with the received first search query may be performed when it is determined that the selected at least one search result was purchased during the same session of use of the electronic marketplace.

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to execute the instructions.

FIG. 1 is a network diagram depicting a client-server system 100 according to aspects of the disclosure. A networked system 102, in the example forms of a network-based marketplace or publication system, provides server-side functionality, via a network 104 (e.g., the Internet or a Wide Area Network (WAN)) to one or more client machines. FIG. 1 illustrates, for example, a web client 106 (e.g., a browser, such as the Internet Explorer browser developed by Microsoft Corporation of Redmond, Wash.) and a programmatic client 108 executing on respective client machines 110 and 112.

An API server 114 and a web server 116 are coupled to, and provide programmatic and web interfaces respectively to, one or more application servers 118. The application servers 118 host one or more applications, such as a marketplace application(s) 120, a payment application(s) 122, and one or more dynamic price range applications 132. The application servers 118 are, in turn, shown to be coupled to one or more database servers 124 that facilitate access to one or more databases 126.

The marketplace application(s) 120 may provide a number of marketplace functions and services to users who access the networked system 102. The payment application(s) 122 may likewise provide a number of payment services and functions to users. The payment application(s) 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace application(s) 120.

The application server 118 may also include one or more dynamic price range application(s) 132 to determine and/or associate price ranges of items offered by the electronic marketplace with search queries received for those offered items. In one embodiment, the dynamic price range application(s) 132 may determine one or more price points for a given search query, and then determine corresponding price quantiles for the search query based on the collected price points. The determined price quantiles may then be smoothed or consolidated into one or more price ranges for display on a client machine in communication with the application server 118. Thus, in some embodiments, the dynamic price range application(s) 132 may determine more or less price quantiles for a given search query than are displayed to a user. By merging and/or smoothing the price quantiles into the various price ranges, the user is shown price ranges that are relevant to his or her interest, and presenting a confusing or cluttered set of results is avoided.

As discussed further below, the price points may be collected from one or more sources, such as items being offered for sale through the electronic marketplace, items being offered at auctions hosted by the electronic marketplace, items having been previously sold through the electronic marketplace, external sources (e.g., application-programming interfaces to other electronic marketplaces), and other such sources. Thus, when a search query is received for items being offered for sale through the electronic marketplace, the application server(s) 118 may provide one or more price ranges for the prices of search results that correspond to the received search query. As discussed previously, such determination and price ranges significantly reduce the amount of time a user spends in determining whether the electronic marketplace has items within his or her price range. Furthermore, as the dynamic price range application(s) 132 may continuously or intermittently determine the price quantiles (from which the price ranges are then displayed to the user), the displayed price ranges may be relatively current, which provides a measure of confidence to the user that he or she is receiving the most currently available pricing information.

While the marketplace application(s) 120, the payment application(s) 122, and the dynamic price range application(s) 132, are shown in FIG. 1 to form part of the networked system 102, it will be appreciated that, in alternative embodiments, the applications 120,122,132 may be separate or distinct from the system 102. For example, the payment application(s) 122 may form part of a payment service that is separate and distinct from the networked system 102.

Further, while the system 100 shown in FIG. 1 employs a client-server architecture, the embodiments are, of course not limited to such an architecture, and could equally well find application in a distributed, or peer-to-peer, architecture system, for example. The marketplace application(s) 120, the payment application(s) 120, the dynamic price range application(s) 132 could also be implemented as standalone software programs, which do not necessarily have networking capabilities.

The web client 106 may access the marketplace application(s) 120, the payment application(s) 122, and the dynamic price range application(s) 132 via the web interface supported by the web server 116. Similarly, the programmatic client 108 may access the various services and functions provided by the applications 120,122,132 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, payment, or advertising functions that are supported by the relevant applications of the networked system 102.

The networked system 102 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. FIG. 2 illustrates exemplary applications that may be executable by the foregoing application server(s) 118 to support the aforementioned mechanisms. To this end, the marketplace and payment applications 120 and 122 are shown to include at least one publication application 200 and one or more auction applications 202, which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives, and features that are specific and personalized to a relevant seller.

Reputation applications 208 allow users who transact, utilizing the networked system 102, to establish, build, and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (e.g., through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page on which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace or may be customized (or internationalized) presentations of a common underlying marketplace. The networked system 102 may, accordingly, include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application 214) may enable key word searches of listings published via the networked system 102. A browse application may allow users to browse various category, catalogue, or inventory data structures according to which listings may be classified within the networked system 102. Various other navigation applications 214 may be provided to supplement the search and browsing applications.

In order to make the listings available via the networked system 102, as visually informing and attractive as possible, the applications 120 and 122 may include one or more imaging applications 216, which users may utilize to upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102, such as, for example, messages advising users regarding the status of listings at the networked system 102 (e.g., providing "outbid" notices to bidders during an auction process or to providing promotional and merchandising information to users). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 232. For example, a buyer may earn loyalty or promotion points for each transaction established and/or concluded with a particular seller, and be offered a reward for which accumulated loyalty points can be redeemed.

Furthermore, and referring back to FIG. 1, the dynamic price range application(s) 132 may leverage one or more of the applications 200-232 in determining the price quantiles and ranges associated with the listings hosted by the electronic marketplace and for providing a meaningful display of this information. In other words, the dynamic price range application(s) 132 may invoke or use data gathered by the applications 200-232 in determining which prices to use as price points for a given search query, which listings to include in the determined price quantiles, and which price quantiles are ultimately displayed to the user as selectable price ranges. For example, the dynamic price range application(s) 132 may obtain one or more search queries via the navigation application(s) 214, and prices for the various listings via the auction application(s) 202 and/or the fixed-price application(s) 204. The dynamic price range application(s) 132 may also access other applications shown in FIG. 2, such as the store application(s) 206, to obtain prices for items that were previously sold.

As the dynamic price application(s) 132 may be integrated (e.g., directly or indirectly) with the application server 118, the dynamic price range application(s) 132 may leverage the data obtained from the applications 200-232 and provide relatively up-to-date or current price ranges for items being offered through the electronic marketplace. This integration may further extend to the one or more database server(s) 124 and/or database(s) 126 in communication with the application server(s) 118. As discussed below, the dynamic price range application(s) 132 may access stored information, such as session logs, to determine which price points to include in the determination of the price quantiles and corresponding price ranges for the received search queries.

Figure 3:
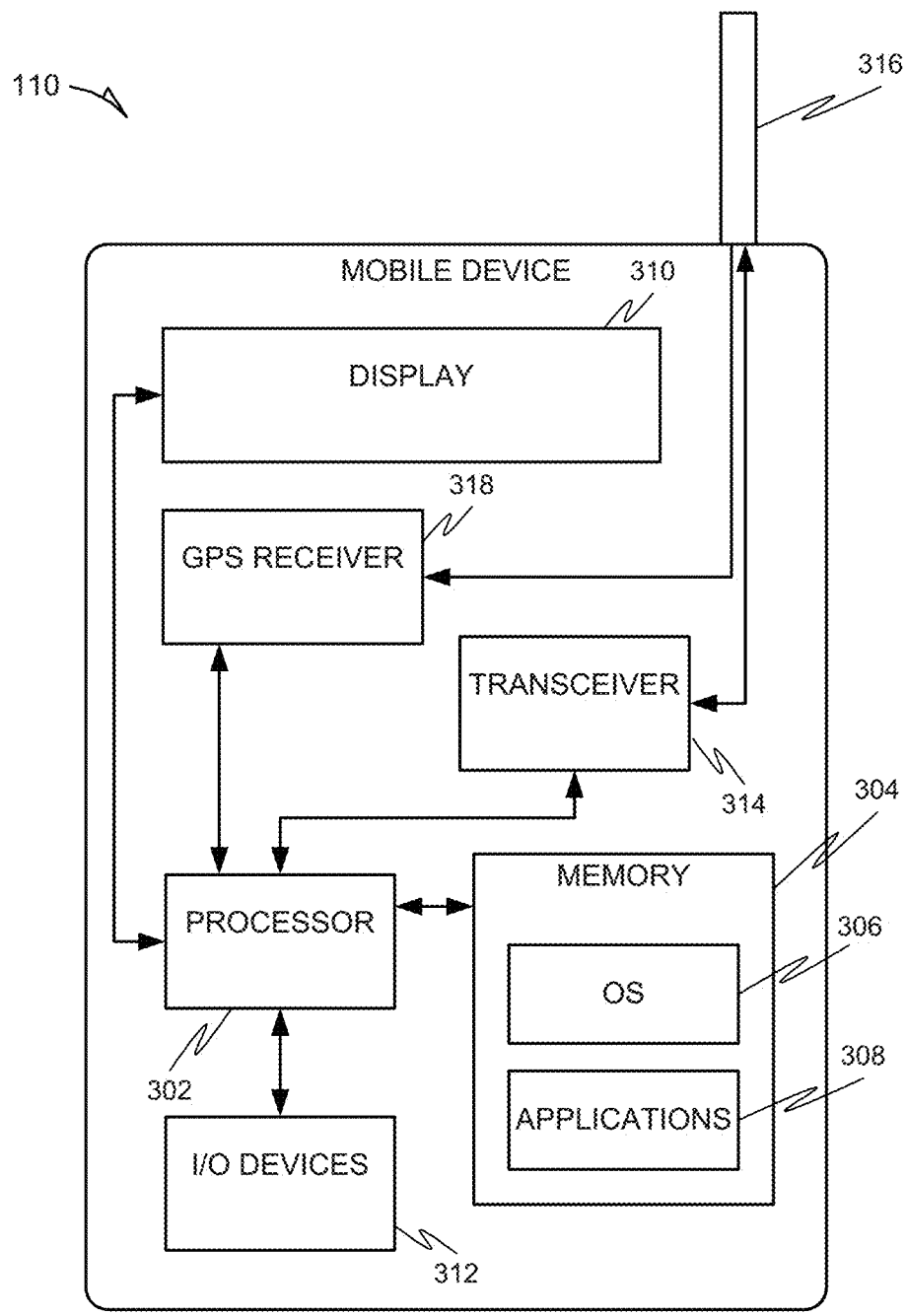
FIG. 3 illustrates an exemplary client machine according to aspects of the disclosure.

FIG. 3 illustrates one example of a client machine 110 in accordance with aspects of the disclosure. In one embodiment, the client machine 110 may be a mobile device. The mobile device may include a processor 302. The processor 302 may be any of a variety of different types of commercially available processors suitable for mobile devices (e.g., an ARM architecture microprocessor, a Microprocessor without Interlocked Pipeline Stages (MIPS) architecture processor, or another type of processor). A memory 304, such as a random access memory (RAM), a Flash memory, or other type of memory, is typically accessible to the processor 302. The memory 304 may be adapted to store an operating system (OS) 306, as well as application programs 308, such as a mobile location enabled application that can provide location-based services to a user. The processor 302 may be coupled, either directly or via appropriate intermediary hardware, to a display 310 and to one or more input/output (I/O) devices 312, such as a keypad, a touch panel sensor, a microphone, and the like. Similarly, in some embodiments, the processor 302 can be coupled to a transceiver 314 that interfaces with an antenna 316. The transceiver 314 may be configured to both transmit and receive cellular network signals, wireless data signals, or other types of signals via the antenna 316, depending on the nature of the mobile device 900. Further, in some configurations, a GPS receiver 318 may also make use of the antenna 316 to receive GPS signals.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments. It is contemplated that any features of any embodiments disclosed herein can be combined with any other features of any other embodiments disclosed herein. Accordingly, these any such hybrid embodiments are within the scope of the present disclosure.

Figure 4:
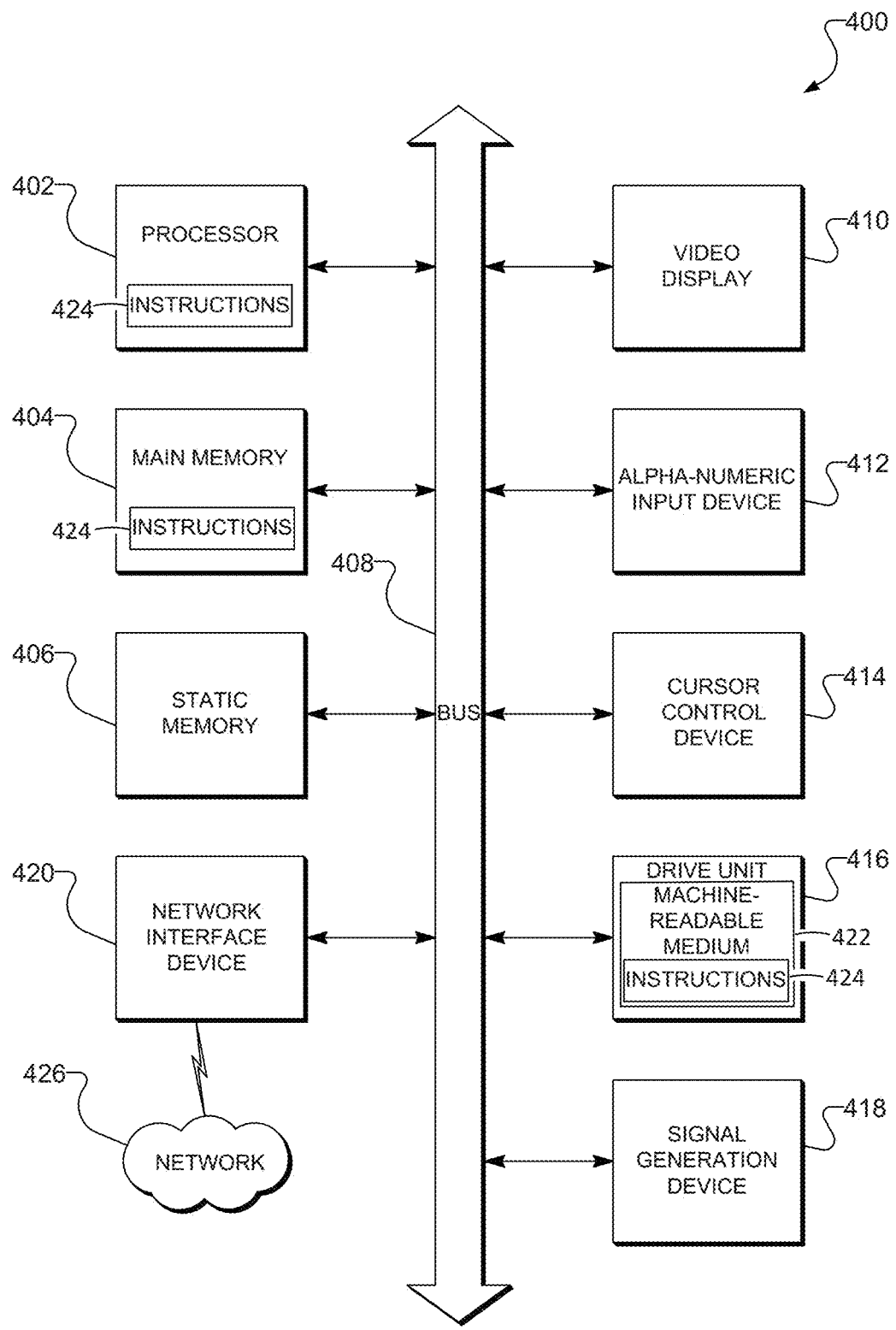
FIG. 4 is a block diagram illustrating components of a machine, according to some example embodiments, able to read instructions from a machine-readable medium and perform any one or more of the methodologies discussed herein, according to aspects of the disclosure.

FIG. 4 is a block diagram illustrating components of a machine, according to some example embodiments, able to read instructions from a machine-readable medium and perform any one or more of the methodologies discussed herein, according to aspects of the disclosure. In particular, FIG. 4 illustrates an exemplary computer system 400 within which instructions 424 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a user interface (UI) navigation (or cursor control) device 414 (e.g., a mouse), a disk drive unit 416, a signal generation device 418 (e.g., a speaker) and a network interface device 420.

The disk drive unit 416 includes a non-transitory machine-readable medium 422 on which is stored one or more sets of data structures and instructions 424 (e.g., software) embodying or utilized by any one or more of the methodologies or functions described herein. The instructions 424 may also reside, completely or at least partially, within the main memory 404 and/or within the processor 402 during execution thereof by the computer system 400, the main memory 404 and the processor 402 also constituting non-transitory, machine-readable media. The instructions 424 may also reside, completely or at least partially, within the static memory 406.

While the machine-readable medium 422 is shown in an example embodiment to be a single medium, the term "machine-readable medium" may include a single medium or multiple media (e.g., a centralized or distributed database, and/or associated caches and servers) that store the one or more instructions 424 or data structures. The term "machine-readable medium" shall also be taken to include any tangible medium that is capable of storing, encoding, or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 424 may further be transmitted or received over a communications network 426 using a transmission medium. The instructions 424 may be transmitted using the network interface device 420 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Figure 5:
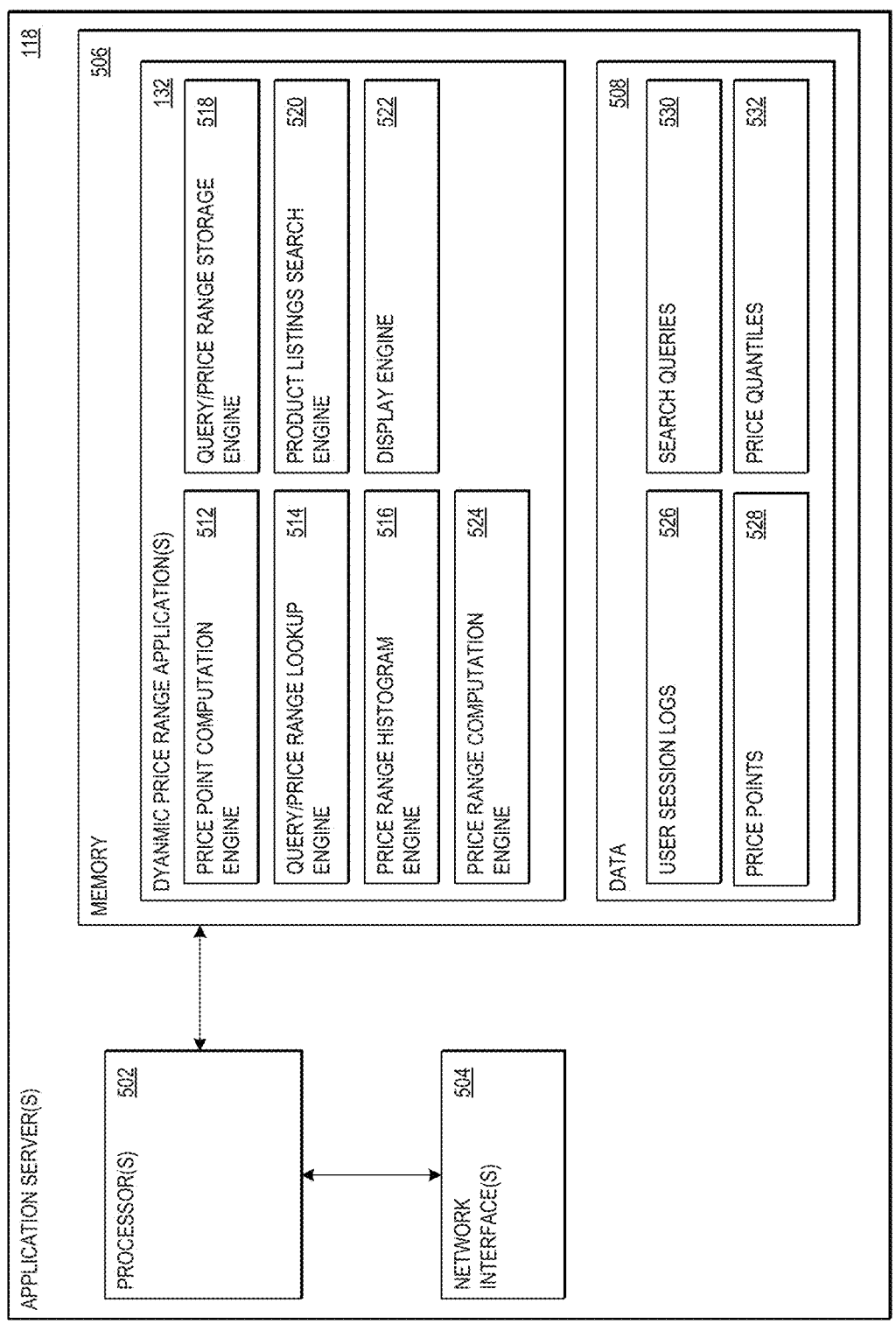
FIG. 5 is a block diagram illustrating components of an application server having various dynamic price range applications according to aspects of the disclosure.

FIG. 5 a block diagram illustrating components of the application server(s) 118 having various dynamic price range application(s) 132 according to aspects of the disclosure. For clarity, some of the components depicted in FIG. 1 are not illustrated, such as the marketplace application(s) 120 and the payment application(s) 122. However, it should be understood that the illustration of the application server(s) 118 is not meant to be limiting, but to describe additional and/or alternative components that may be included in the application server(s) 118.

In one embodiment, the application server(s) 118 may include one or more processor(s) 502, one or more network interface(s) 506, and a non-transitory, computer-readable memory 508. The memory 508 may include one or more of the dynamic price range application(s) 132. The memory 508 may also include data 506 accessed or used by the one or more dynamic price range application(s) 132. Although the data 506 is shown as being housed within the same block as the dynamic price range application(s) 132, the data 506 may be housed or stored in other locations, such as the database(s) 126, and accessed via an intermediary machine, such as the database server(s) 124.

The dynamic price range application(s) 132 may include one or more applications that select and/or determine the price points in the determination of the various price quantiles. The dynamic price range application(s) 132 may also include one or more applications that determine corresponding price ranges based on the determined price quantiles, and the listings that are used to populate the items associated with these price ranges. In one embodiment, the dynamic price range application(s) 132 may include a price point computation engine 512, a query/price range lookup engine 514, a price range histogram engine 516, a query/price range storage engine 518, a product listings search engine 520, a display engine 522, and a price range computation engine 524.

Data 506 may include various types of information used in determining and associating price quantiles with received search queries. In one embodiment, the data 506 may include user session logs 526, price points 528, search queries 530, and price quantiles 532. Although the dynamic price range application(s) 132 and data 506 are shown as included separate applications and information, it should be understood that the dynamic price range application(s) 132 and data 506 may include alternative arrangements, such as more or fewer applications and/or data.

The price point computation engine 512 may be configured to determine which price points to use in determining price quantiles for received search queries. The sources of the price points may vary and may include prices for listings hosted by the electronic marketplace (e.g., the prices obtainable via the auction application(s) 202 and/or fixed-price application(s) 204), prices for previously sold items, price for items hosted by other electronic marketplaces, and other such sources.

In one embodiment, the price point computation engine 512 may obtain price points from listings currently being offered. As discussed below, the price point computation engine 512 may operate in conjunction with the product listings search engine 520 to obtain the listings from where the price points may be extracted. When one or more search results are presented to a user in response to a given search query, the price point computation engine 512 may monitor which results the user selects. The prices associated with the one or more search results that the user selects may form the basis for the price points to be used in the determination of the various price quantiles. Alternatively, or in addition, the price point computation engine 512 may use the prices of listings obtained from the search query regardless of whether a given listing is selected by a user. Furthermore, while the price point computation engine 512 may obtain prices in a real-time, or in a near real-time manner (e.g., as search queries are received and as search results are provided), the price point computation engine 512 may reference other sources of information for the price points, such as the user session logs 526 where user session data (e.g. search queries, search results, search result selections, etc.) may be temporarily stored.

In addition, the price point computation engine 512 may process prices differently depending on the listing associated with the price such as auction listings, fixed-price listings, new listings, used listings, and other such listings. Where a listing is an auction listing, the price point computation engine 512 may monitor the auction until it completes or closes. When the auction completes or closes, the price point computation engine 512 may use the price of the offered item or service at closing. Where the listing is a fixed-price listing, the price point computation engine 512 may use the price of associated with the fixed-price listing as the price point. Furthermore, the price point computation engine 512 may employ a weighting factor to further distinguish price points from one another. For example, a price associated with a new listing may be weighted differently than a price associated with a used listing. Similarly, a price associated with an auction listing may be weighted differently than a price associated with a new listing. Thus, the price point computation engine 512 is configured to distinguish prices for various listings which, in turn, provides for a more accurate and relevant statistical data set for determining the various price quantiles.

Furthermore, the price point computation engine 512 may process prices associated with items purchased by a user during the same session in which a search query was received. For example, the price point computation engine 512 may process the price of a digital camera where a user searches for digital cameras in a session of use with the electronic marketplace, and then purchases the digital camera during the same session. As above, the price point computation engine 512 may distinguish between prices that are associated with items that a user selected but did not purchase, items that the user selected but purchased in a later session of use, and items that the user selected and purchased in the same session.

The price point computation engine 512 may also leverage filters, or other refinements a user has selected to a refine a set of search results, in processing and/or determining price points for a given search query. For example, when a set of search results is displayed to the user, the user may also view one or more filters for refining the set of search results. These filters may include physical characteristics of the search results (e.g., size, weight, capabilities, etc.), manufacturing characteristics (e.g., model, manufacturer, style, etc.), and pricing characteristics. The pricing characteristics may include a manual entry of prices that the user is willing to pay for a given item. The pricing characteristics may include a variety of entry mechanisms including a slider, text entry, or other such mechanisms. When a pricing characteristic value is provided (i.e., when the user provides a price via the pricing characteristic), the price point computation engine 512 may associate the provided price as the price point for the received search query.

While the price point computation engine 512 may leverage the prices associated with listings for items currently offered for sale as the price points in determining the price quantiles, the price point computation engine 512 may also use the prices associated with previously sold items. In one embodiment, the price point computation engine 512 may invoke the product listings search engine 520 to obtain prices for items previously sold that match the given search query. The items previously sold may cover a given timespan, e.g., 60 days, 90 days, or other timespan. In an alternative or additional embodiment, the items previously sold may also cover a seasonal pattern. For example, the price of a swim suit may vary (e.g., the price may be slightly higher just before the start of summer than in mid-winter), and the price point computation engine 512 may be configured to capture such seasonal variations. Thus, the price point computation engine 512 may be configured to capture the prices of previously sold items as well as the prices for selected or purchased items in order to provide a more accurate reflection of the price quantiles for a given search query.

Finally, price point computation engine 512 may configured to obtain prices for items matching the given search query from other electronic marketplaces. In one embodiment, the price point computation engine 512 may access an application programming interface ("API") for an outside electronic marketplace, which may accept search queries and provide search results in response. In this embodiment, the price point computation engine 512 may provide the given search query to the API for the outside electronic marketplace, and use the prices of the returned search results (if any) as the price points to associate with the given search query. Thus, the price point computation engine 512 may be configured to obtain a breadth of pricing information other than the pricing information available to it via internal mechanisms (e.g., the marketplace application(s) 120, payment application(s) 122, etc.).

Having obtained the various prices and/or price points, the price point computation engine 512 may store such prices and/or price points as the price points 528. Furthermore, the price point computation engine 512 may store an association of the price points 528 and their respective search queries which, as explained below, may be stored as search queries 530. Furthermore, the price point computation engine 512 may be configured to update or re-determine the price points for a given search query at one or more predetermined time intervals (e.g., daily, weekly, monthly, etc.). In this manner, the price point computation engine 512 may ensure that the stored price points 528 are relatively up-to-date or current.

As alluded to above, the product listings search engine 520 may be configured to obtain listings that match a given search query. The listings obtained by the product listings search engine 520 may be current listings (e.g., auction listings, fixed price listings, etc.), listings that have ended, listings where the item described in the listing was purchased, listings for used items, listings for new items, and other such listings. The product listings search engine 520 may communicate with one or more applications, such as the auction application(s) 202, the fixed-price application(s) 204, the store application(s) 206, and other such applications in obtaining the listings based on the given search query. In addition, the search queries may come from a variety of sources, such as from user session logs 526 of prior search queries, current search queries from users currently searching the electronic marketplace, and combinations thereof. In addition, when a search query is received, the product listings search engine 520 may employ one or more natural language processing techniques to determine one or more variants of the received search query. Thus, when a search query is received (e.g., "digital camera"), the search results may encompass search results from variations of the received search query (e.g., "optical camera," "digital SLR camera," "digital photography," etc.). In one embodiment, the product listings search engine 520 may be configurable as to the degree of variation in the received search query.

The price range computation engine 524 may be configured to determine the various price quantiles for a given search query (e.g., the search queries 530) based on their associated price points (e.g., the price points 528). In one embodiment, the price range computation engine 524 may determine the price quantiles according to one or more known techniques. As an example, for a population of discrete values, or for a continuous population density, the kth q-quantile may be the data value where the cumulative distribution function crosses k/q. In other words, x is a kth q-quantile for a variable X if:

$$Pr[X<x] \le k/q (\text{or alternatively}, Pr[X \ge x] \ge 1-k/q); \text{ and}$$

$$Pr[X \le x] \ge k/q (\text{or alternatively}, Pr[X > x] \le 1-k/q).$$

For a finite population of N values indexed 1, ..., N from lowest to highest, the kth q-quantile of this population may be computed via the value of $$I_p = N\frac{k}{q}.$$

If $I_p$ is not an integer, then one would round up to the next integer to get the appropriate index; the corresponding data value may be the kth q-quantile. On the other hand, if $I_p$ is an integer then any number from the data value at that index to the data value of the next may be taken as the quantile, and it is understood to take the average of those two values.

If, instead of using integers k and q, the "p-quantile" is based on a real number p with 0<p<1, then p may replace k/q in the above formulas. Some may regard the minimum and maximum as the 0th and 100th percentile, respectively; however, such terminology is an extension beyond traditional statistics definitions.

In another embodiment, the number of price quantiles may be predetermined according to one or more price quantile distribution factors, such the category of goods and/or services of the received search query (e.g. digital photography, camera equipment, home goods, etc.), the region where the user is located that provided the search query (e.g., North America, United States of America, California, etc.), and other such price quantile distribution factors. In determining the various price quantiles, the price range computation engine 524 may further determine the minimum value and/or maximum value for a given quantile. Furthermore, the price range computation engine 524 may employ various smoothing techniques conform the price quantiles to multiples of currency multipliers (e.g., 1, 10, 100, etc.), to be contiguous (e.g., the maximum value of a first quantile may be slightly less than the minimum value of a second quantile), and other such smoothing techniques. In one embodiment, the currency multiplier may be based on user-provided information, such as where the user is geographically located.

The query/price range storage engine 518 may then store the determined price quantiles in the data 508 (e.g., in the price quantiles storage 532). The query/price range storage engine 518 may also store an association between the received search query and the determined price quantiles The query/price range lookup engine 514 may facilitate the retrieval of the stored price quantiles 532. For example, when a subsequent search query is received, the query/price range lookup engine 514 may be configured to retrieve the one or more stored price quantiles 532 associated with the subsequent search query. Furthermore, the query/price range lookup engine 514 may be configured to retrieve one or more stored price quantiles 532 associated with search query variations of the received search query.

When the stored price quantiles 532 are retrieved, they may be passed to the price range histogram engine 516 to determine the number of items per stored price quantile matching the received search query (including variants). Thus, where five quantiles have been determined for a given search query, the price range histogram engine 516 may determine that there are two items in the first quantile, ten items in the second quantile, fifteen items in the third quantile, four items in the fourth quantile, and six items in the fifth quantile. Of course, depending on the number of matching items, the number of items per price quantile may vary.

While the user may be displayed the stored price quantiles, there are instances where it is advantageous to display a limited number of pricing quantiles to the user. For example, if a first price quantile only has one item associated with it, it may be beneficial to merge the first price quantile with a second price quantile having additional items. In this way, the user may be presented with one or more price ranges that are less than the number of pricing quantiles so that the user is not overwhelmed with an unwieldy number of price range options. In one embodiment, one or more of the dynamic price range application(s) 132, such as the price range histogram engine 516 or display engine 522, may be configured with an item threshold representing the minimum number of expected items to be in a given price quantile. The item threshold may be a percentage of the total items across all price quantiles associated with a given search query. Thus, where the item threshold is 10%, each price quantile should have at least a number of items equal to 10% of the total number of items from all quantiles. As discussed above, where a price quantile has less than the item threshold, the smaller price quantile may be merged into a larger price quantile. The subsequent merged price quantile (i.e., price range) may then be displayed to the user.

The display engine 522 may be configured to cause the display of the various price ranges (merged, unmerged, or combination thereof) to the user. Although various display options are available, the display engine 522 may be configured to display the price ranges as selectable price ranges, which may allow filtering of one or more search results to the selected price range, to display the price range with a listing count for each price range, and/or to display the ranges in a graphical manner, such as icons that indicate cheap, less expensive, medium expensive, expensive, and other such subjective qualifiers.

Figure 6:
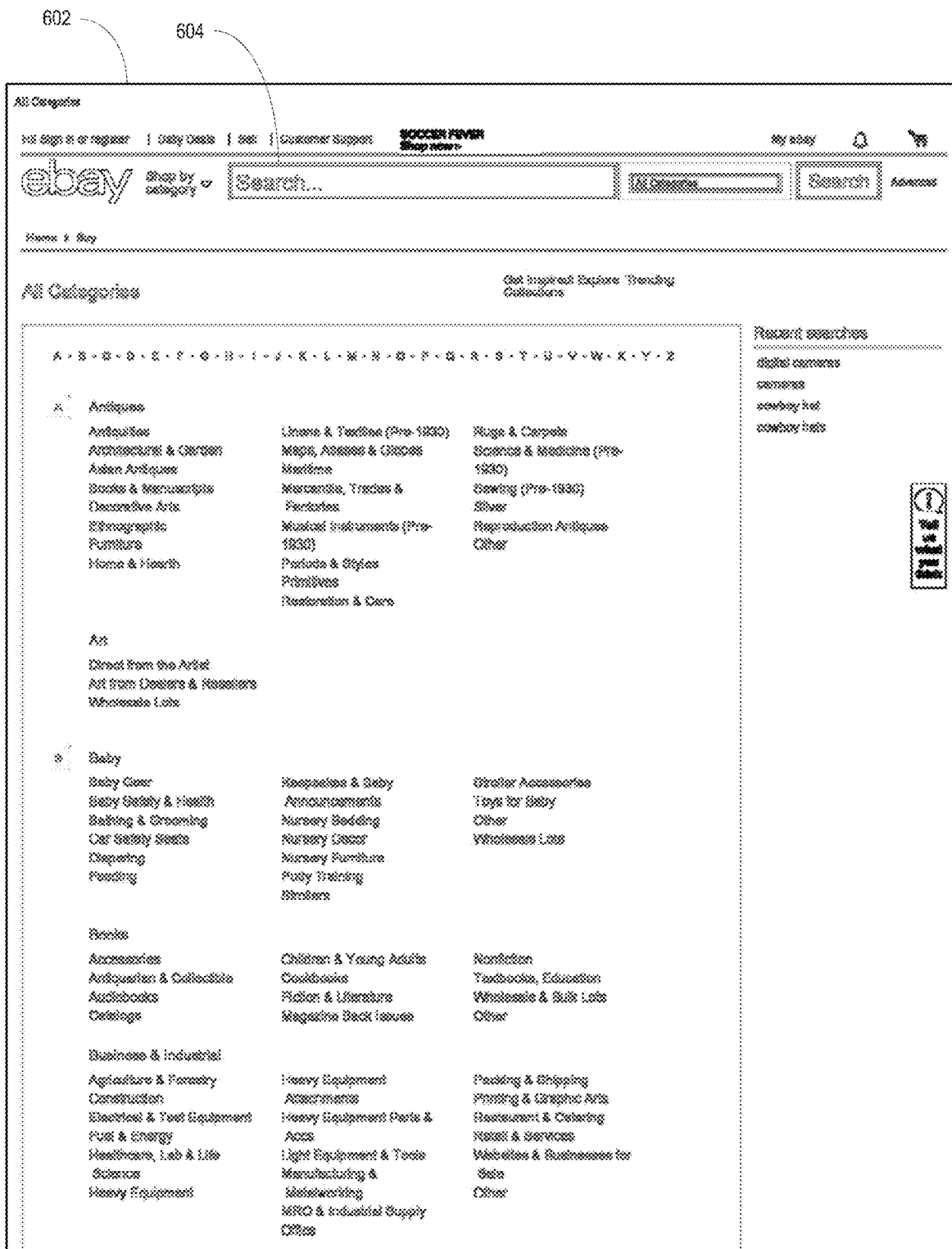
FIG. 6 illustrates a web page of an electronic marketplace configured to receive search queries for items offered for sale by the electronic marketplace according to aspects of the disclosure.

FIG. 6 illustrates a web page 602 of an electronic marketplace configured to receive search queries for items offered for sale by the electronic marketplace according to aspects of the disclosure. The webpage 602 may include an element, such as a text entry box 604, where the user may provide a search query to search for listings offered by the electronic marketplace.

Figure 7:
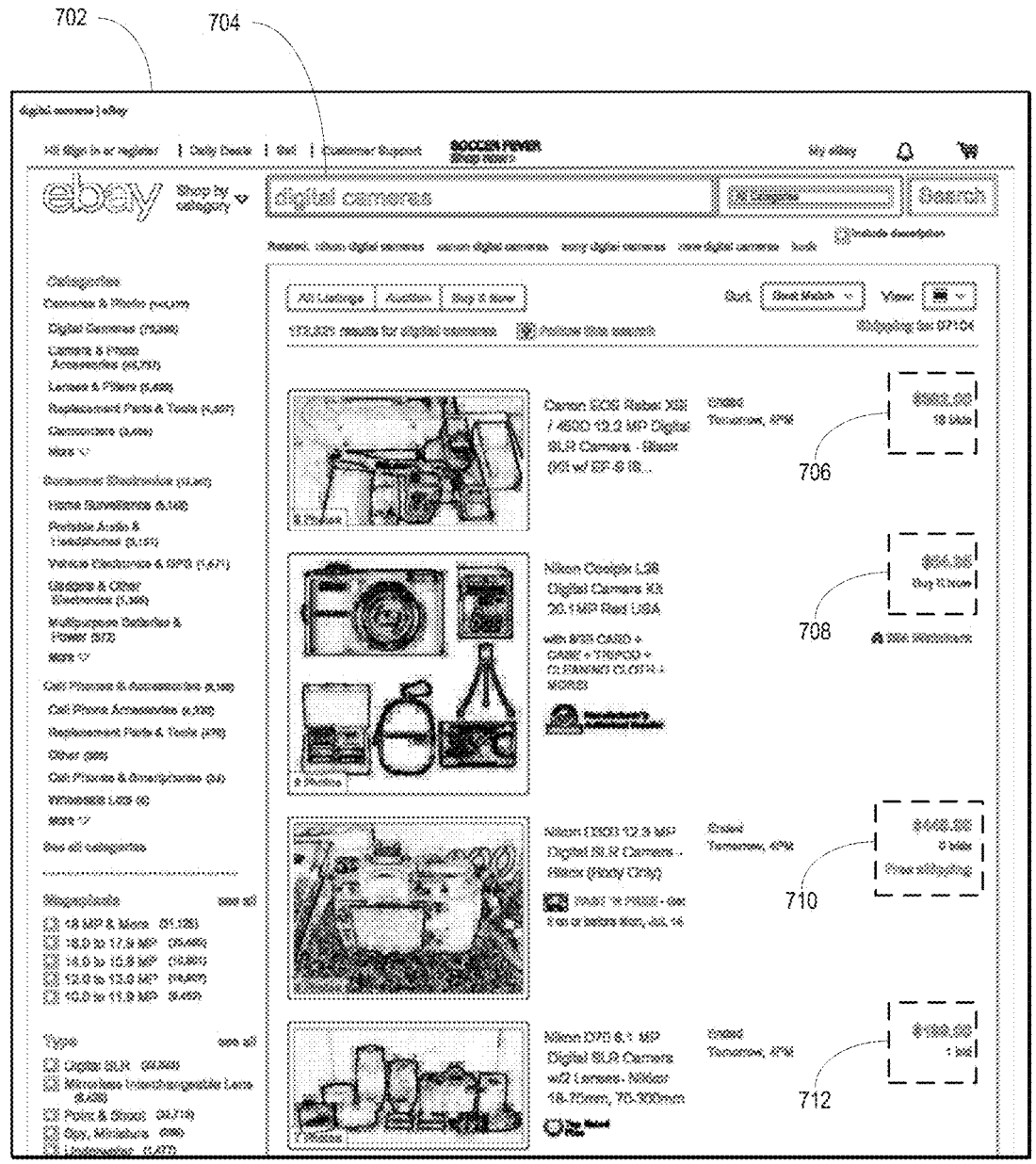
FIG. 7 illustrates another web page of the electronic marketplace displaying search results in response to a received search query according to aspects of the disclosure.

FIG. 7 illustrates another web page 702 of the electronic marketplace displaying search results in response to a received search query 704 according to aspects of the disclosure. As shown in FIG. 7, the search query 704 may include a search term such as "digital cameras." The displayed search results may include listings matching the term "digital cameras," including listings that match variations of that term. In addition, each of the search results may be associated with a price, such as prices 706-712. As discussed above, the price point computation engine 512 may associate one or more of the prices 706-712 as the price points for the received search query 704, which may then be used in the determination of the price quantiles for the received search query 704. As previously discussed, the price points for the received search query 704 may include prices associated with listings selected by the user. Thus, where the user selects the first listing, the price 706 may be associated as a price point with the received search query 704. Furthermore, and as also discuss previously, each of the prices 706-712 may be weighted or processed differently depending on the type of listing associated with the price.

Figure 8:
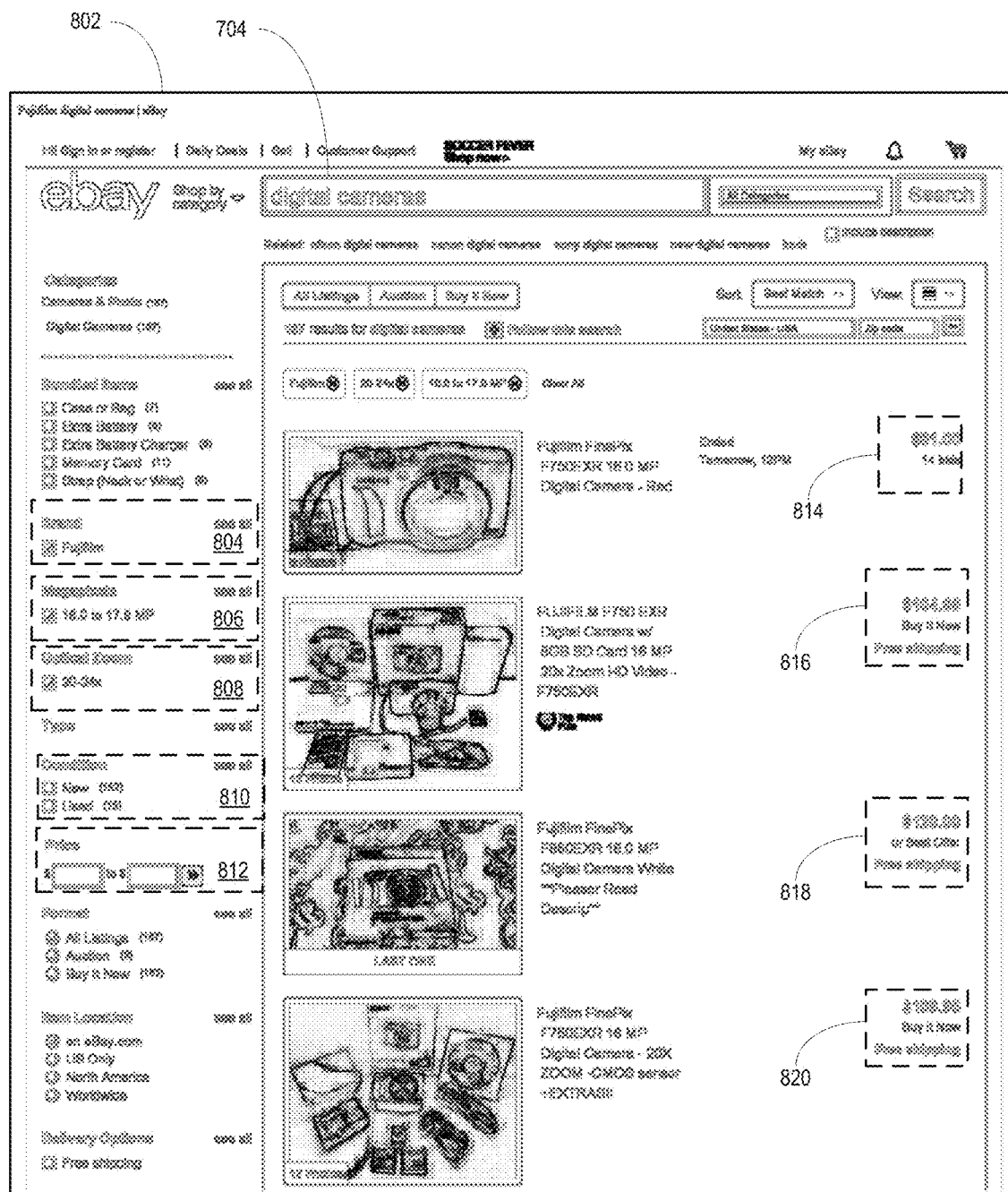
FIG. 8 illustrates yet another web page of the electronic marketplace displaying filters and corresponding filter values for narrowing the scope of displayed search results according to aspects of the disclosure.

FIG. 8 illustrates yet another web page 802 of the electronic marketplace displaying filters 804-812 and corresponding filter values for narrowing the scope of displayed search results according to aspects of the disclosure. Each of the filters 804-812 may be selectable by the user. The filters 804-812 may include a manufacturing characteristic 804 (e.g., a brand), one or more physical characteristics 806-810 (e.g., megapixels, optical zoom ability, condition, etc.), and a pricing characteristic 812. The pricing characteristic 812 may be configurable by the user to display search results matching a price and/or price range entered by the user. Where the user enters or provides a price via the pricing characteristic 812, the price point computation engine 512 may use the price of the entered pricing characteristic 812 as a price point for the received search query 704 and associate it accordingly. In addition, where a user selects one or more the search results, the price point computation engine 512 may also associate one or more of the corresponding prices 814-820 with the received search query 704.

Figure 9:
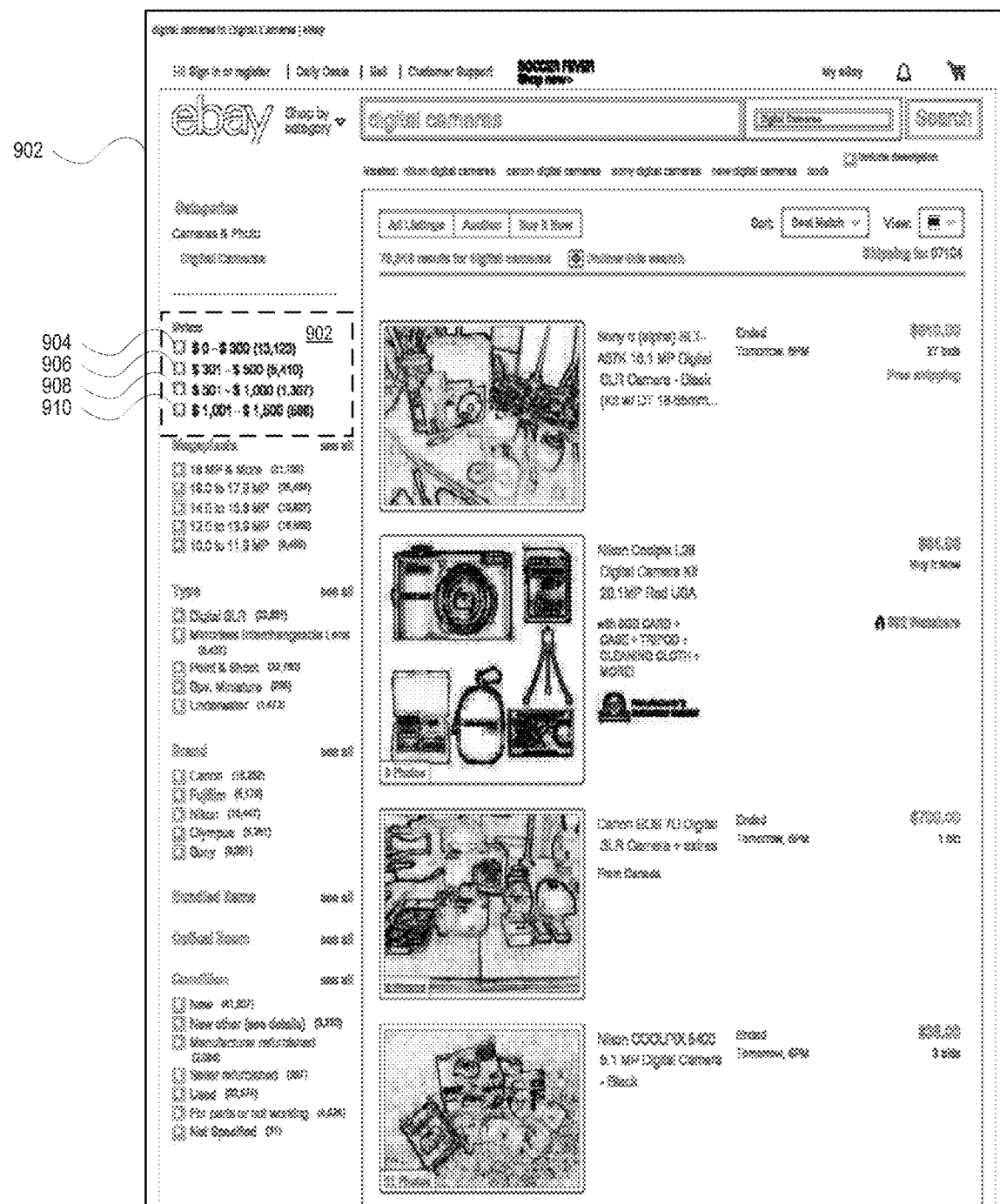
FIG. 9 illustrates a further web page of the electronic marketplace displaying price ranges that have been determined for the received search query according to aspects of the disclosure.

After the price points have been associated with a corresponding search query, and the price quantiles have been determined as previously discussed, the display engine 522 may cause the display of a web page or other electronic document having one or more price ranges corresponding to the determined price quantiles and associated with the received search query. FIG. 9 illustrates a web page 902 of the electronic marketplace displaying price ranges 902 that have been determined for a received search query according to aspects of the disclosure. As shown in FIG. 9, the price ranges 902 may include a first price range 904, a second price range 906, a third price range 908, and a fourth price range 910. Moreover, each of the price ranges 904-910 may be selectable by the user, which may result in a display of search results having prices corresponding to a selected price range. Furthermore, each of the price ranges 904-910 may have a corresponding item count, which may be displayed along-side the respective price range and indicative of the number of items having a price within the respective range. In this manner, not only do the selectable price ranges 904-910 provide a relatively comprehensive view of the prices of items matching a given search query, they also provide a relatively easy and rapid mechanism for a user to narrow in on a specific range that he or she may have in mind.

FIGS. 10A-10E illustrate exemplary logic flows for associating price points with various search queries according to aspects of the disclosure. Any one of the logic flows shown in FIGS. 10A-10E may be used in combination with, or instead of, any other logic flow shown in FIGS. 10A-10E. Thus, in some embodiments, the disclosed systems may perform one or more methods that includes FIGS. 10A-10E.

Figure 10A:
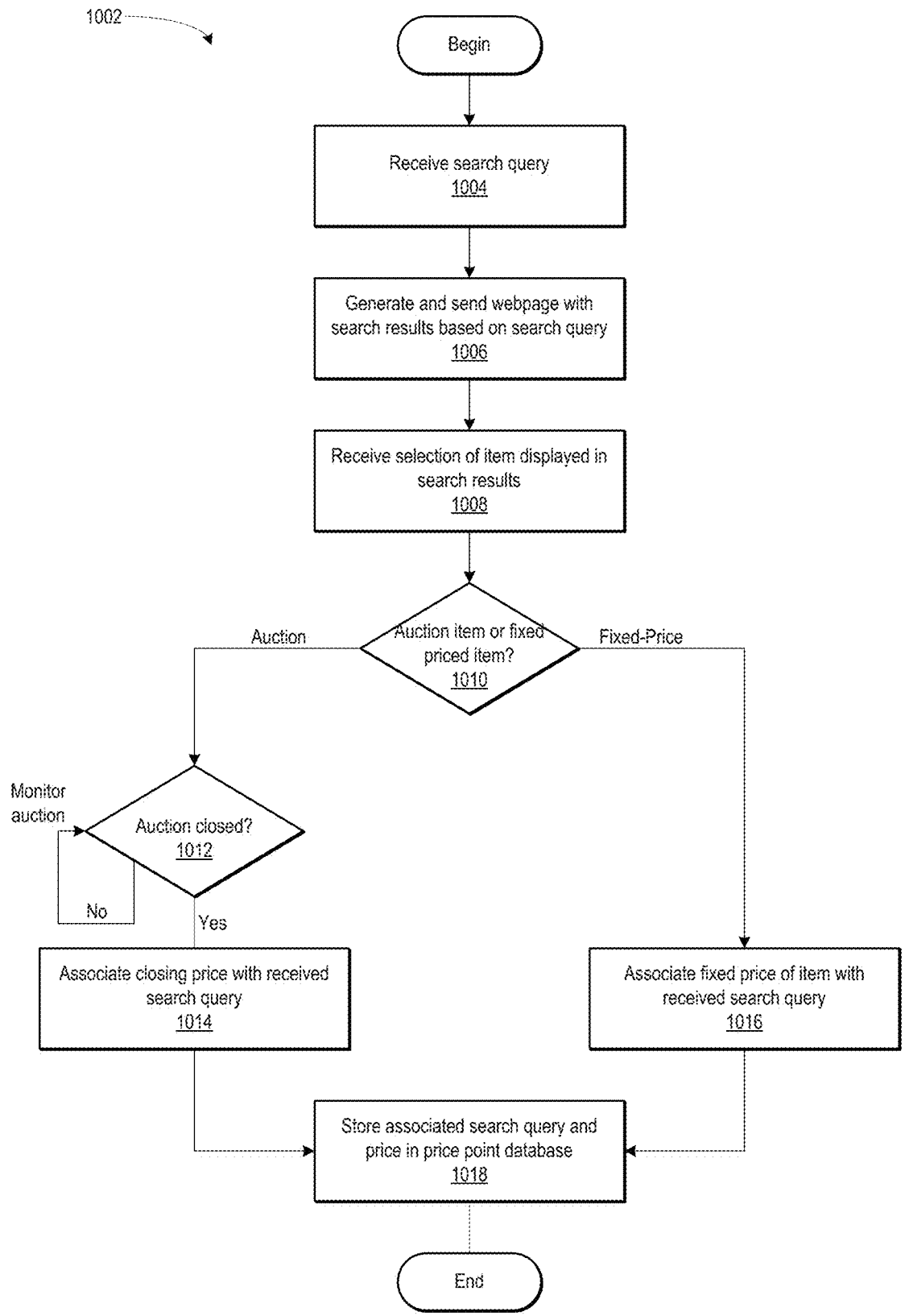
FIGS. 10A-10E illustrates exemplary logic flows for associating price points with various search queries according to aspects of the disclosure.

FIG. 10A illustrates a logic flow 1002 for associating price points of currently offered items with a received search query according to aspects of the disclosure. In one embodiment, a search query may be received (Block 1004). As discussed previously, the received search query may be processed as it is received or it may be stored as part of the user session logs 526 and processed later. A web page (or other electronic document) of search results may then be sent to the user based on the received search query (Block 1006). A selection of one or more of the search results may then be received. (Block 1008). A determination may then be performed as to whether the selected search result is for a particular type of search result. For example, a determination may be performed as to whether the selected search result is for an item being auctioned or an item being offered at a fixed price (Block 1010).

Where the item is being offered at an auction, the auction may be monitored until it closes or completes (Block 1012). When the auction closes or is completed, the closing price of the item being offered may then be associated with the received search query (Block 1014). Alternatively, where the item is offered at a fixed price, the price of the item may then be associated with the received search query (Block 1016). The prices, along with their associations, may then be stored as price points for the received search query to be used in the determination of corresponding price quantiles (Block 1018).

Figure 10B:
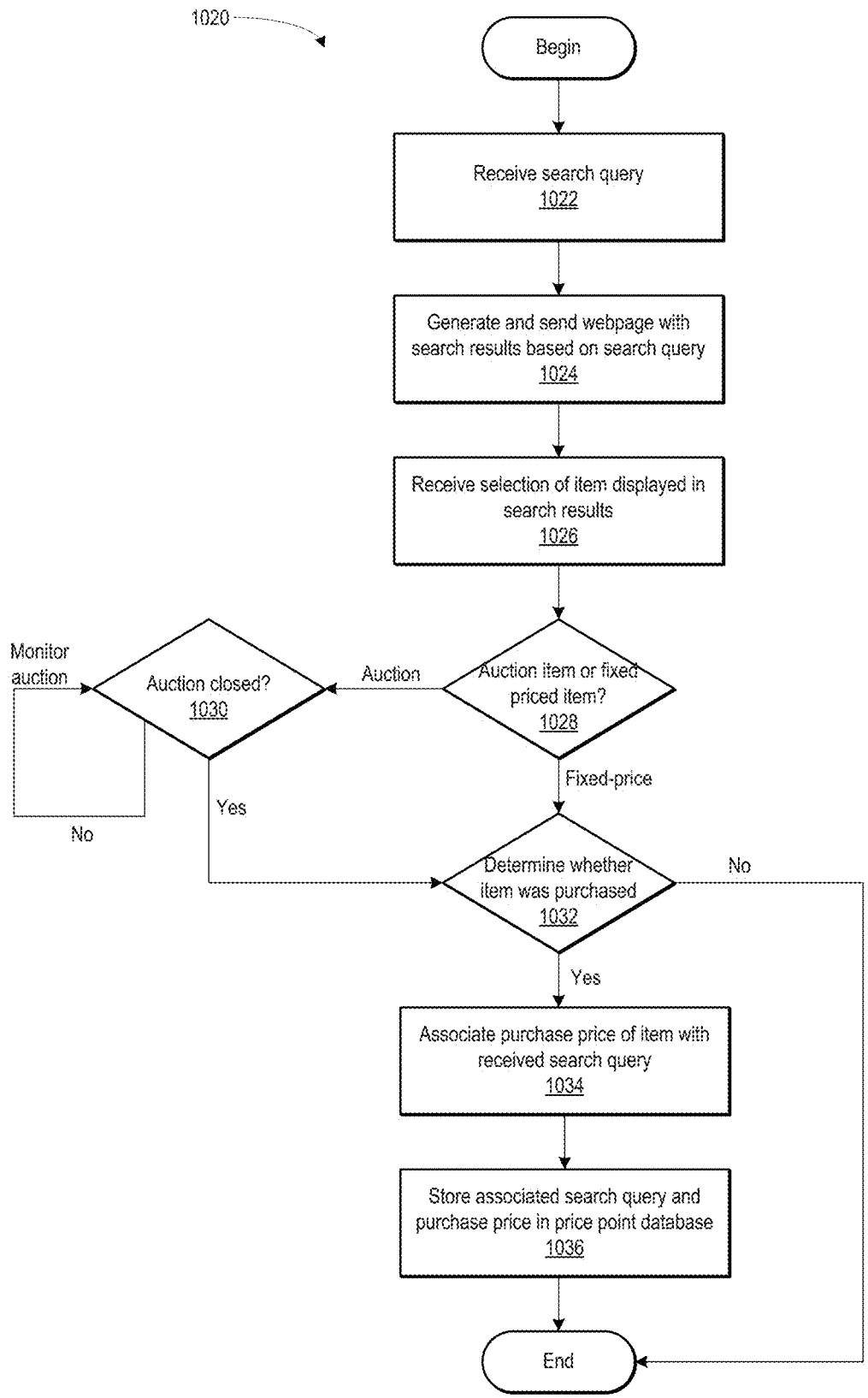

FIG. 10B illustrates another logic flow 1020 for associating price points of items being offered by the electronic marketplace with a received search query. The logic flow 1020 may relate to determining price points for a received search query based on whether an item was purchased during the same session in which the search query was received. In one embodiment, a search query may be received (Block 1022). As discussed previously, the received search query may be processed as it is received or it may be stored as part of the user session logs 526 and processed later. A web page (or other electronic document) of search results may then be sent to the user based on the received search query (Block 1024). A selection of one or more of the search results may then be received. (Block 1026). A determination may then be performed as to whether the selected search result is for a particular type of search result. For example, a determination may be performed as to whether the selected search result is for an item being auctioned or an item being offered at a fixed price (Block 1028).

Where the item is being offered at an auction, the auction may be monitored until it closes or completes (Block 1030). When the auction closes or is completed, or if the offered item is offered at a fixed price, a determination may then be made as to whether the item was purchased during the same session as the search query was received (Block 1032). Where the item was purchased during the same session as the search query was received, the purchase price of the item may be associated with the received search query (Block 1034). The purchase price, along with its association, may then be stored as a price point for the received search query to be used in the determination of corresponding price quantiles (Block 1036).

Figure 10C:
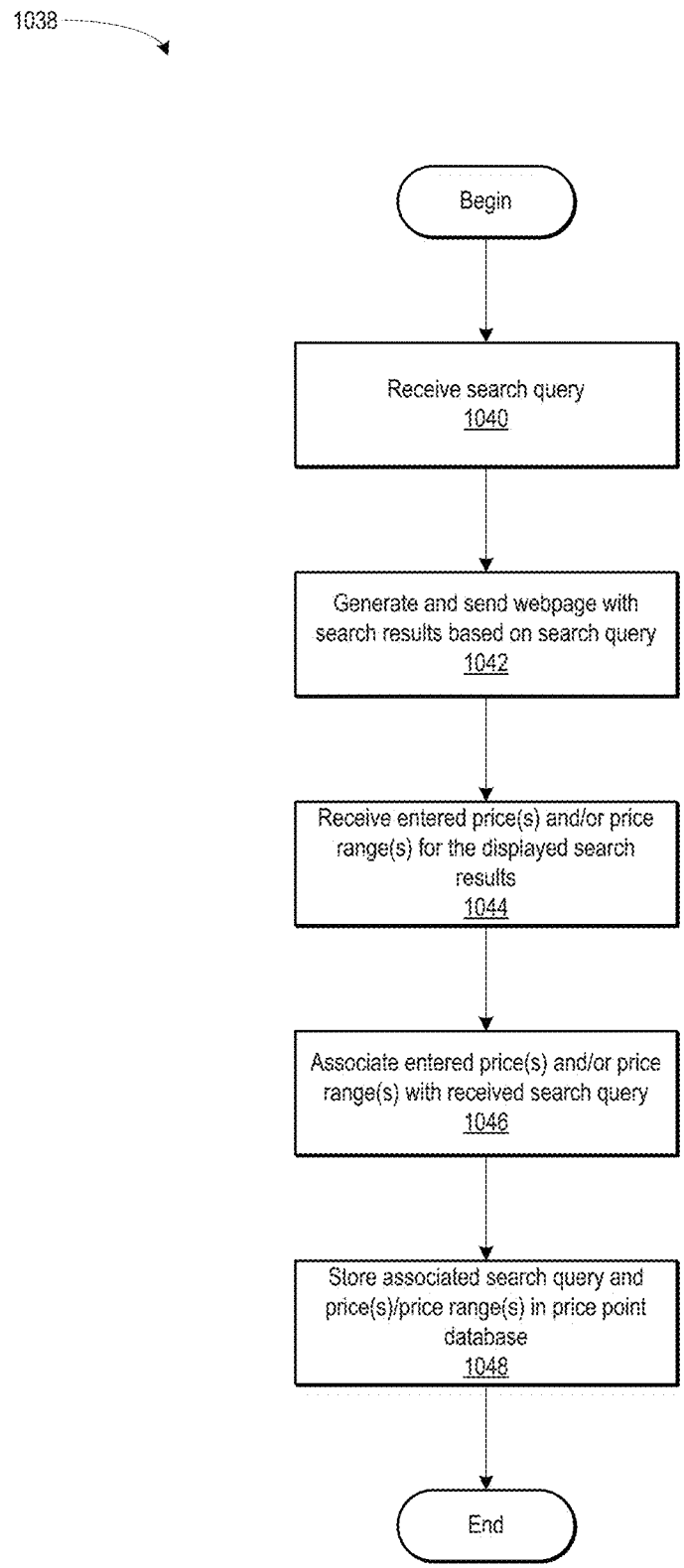

FIG. 10C illustrates a further logic flow 1038 for associating price points of items being offered by the electronic marketplace with a received search query. The logic flow 1038 may relate to associating price points with a received search query based on one or more pricing characteristics provided by a user. In one embodiment, a search query may be received (Block 1040). As discussed previously, the received search query may be processed as it is received or it may be stored as part of the user session logs 526 and processed later. A web page (or other electronic document) of search results may then be sent to the user based on the received search query (Block 1042). The web page may also include the display of filters (e.g., a pricing characteristic), and a manually entered price or price range may be received (Block 1044). The entered price or price range may then be associated with the received search query (Block 1046). Accordingly, the association of the entered price or price range with the received search query may then be stored in the price points storage 528 (Block 1048).

Figure 10D:
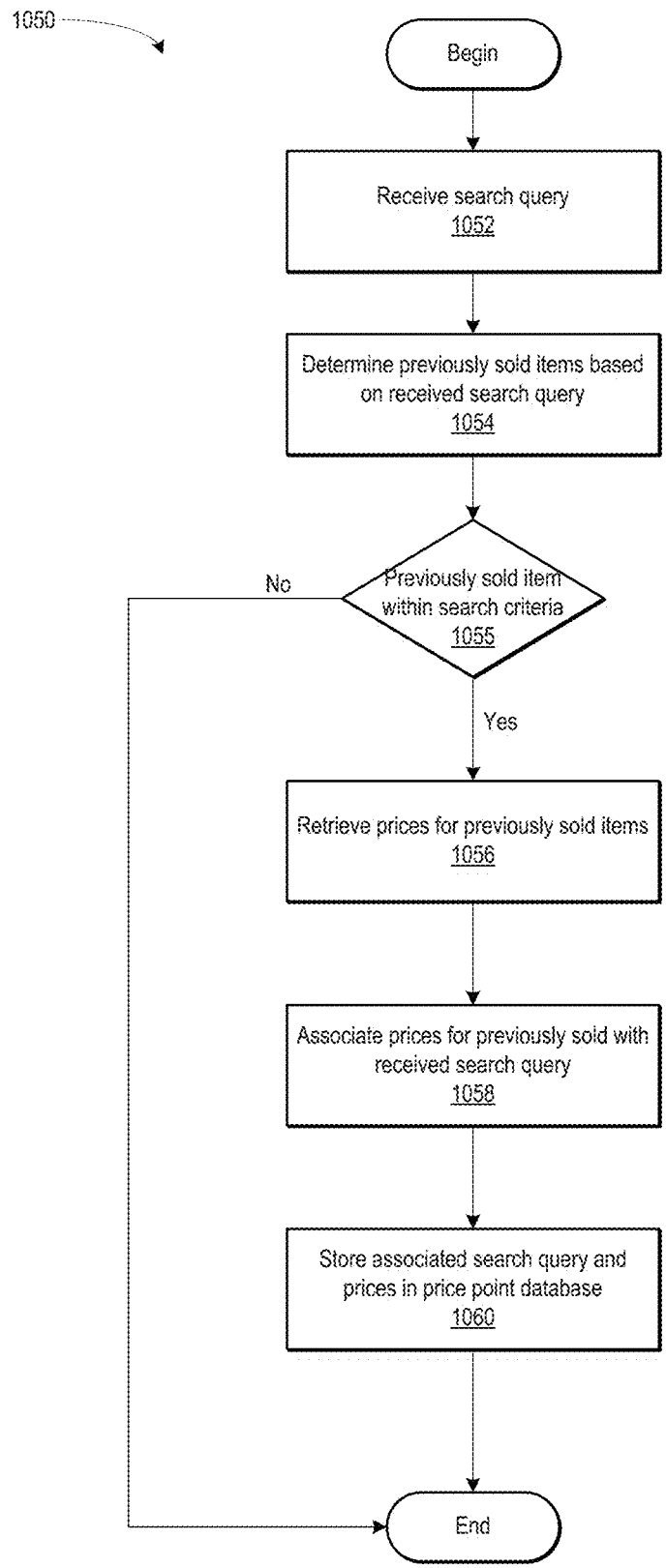

FIG. 10D illustrates yet another logic flow 1050 for associating price points of items being offered by the electronic marketplace with a received search query. The logic flow 1050 may relate to determining price points based on previously sold items that have sold within a given timeframe. In one embodiment, a search query may be received (Block 1052). As discussed previously, the received search query may be processed as it is received or it may be stored as part of the user session logs 526 and processed later. Items that have previously sold matching the received search query may then be determined (Block 1054). A determination may then be performed as to whether the previously sold items meet a given search criteria (e.g., a provided timeframe) (Block 1055). Where one or more previously sold items meet a given search criteria, the prices for the previously sold items may be retrieved (Block 1056). The prices of the previously sold items may then be associated as price points with the received search query (Block 1058). Thereafter, the association between the prices of the previously sold items and the received search query may be stored (Block 1060).

Figure 10E:
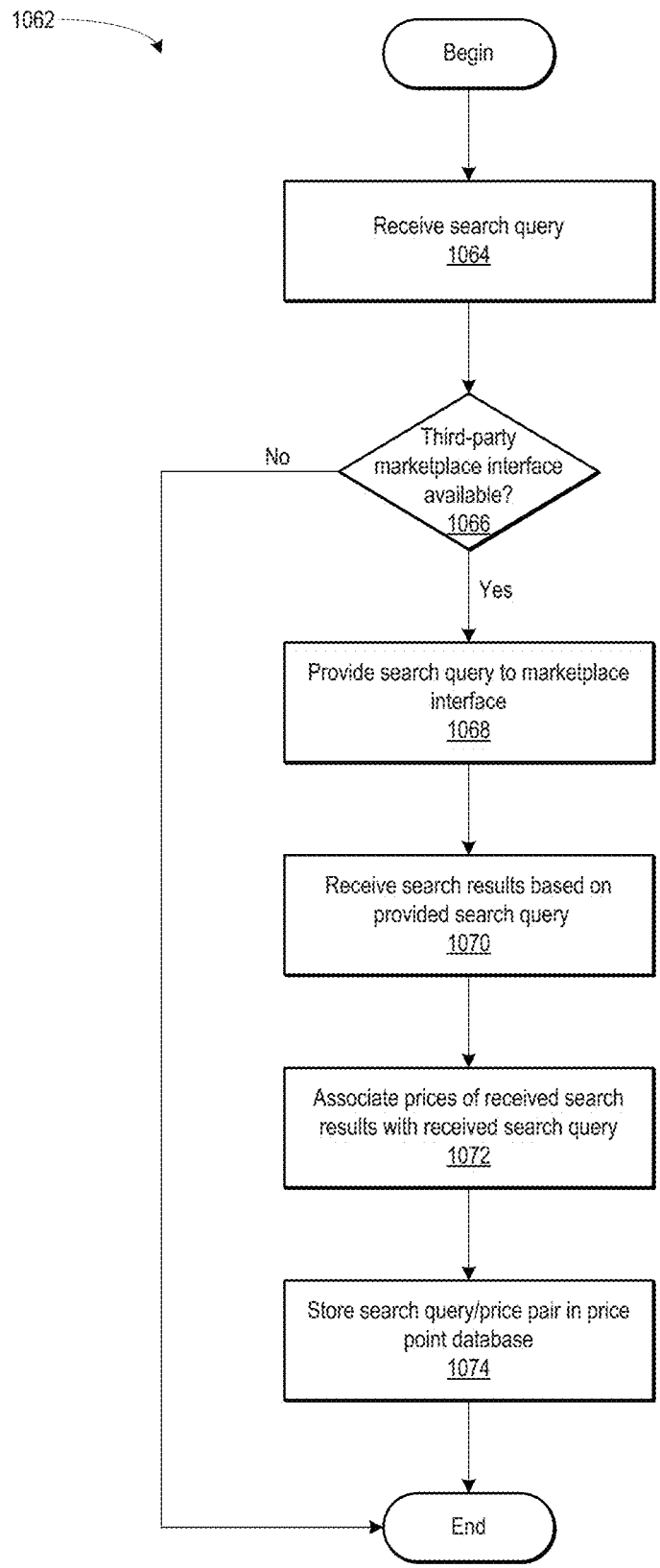

FIG. 10E illustrates an additional logic flow 1062 for associating price points of items being offered by the electronic marketplace with a received search query. The logic flow 1062 may relate to using an API of a third-party electronic marketplace to obtain prices of items matching the received search query, and then associating the obtained prices with the received search query as corresponding price points. In one embodiment, a search query may be received (Block 1064). As discussed previously, the received search query may be processed as it is received or it may be stored as part of the user session logs 526 and processed later. A determination may then be made as to whether an API is available for a third-party electronic marketplace (Block 1066). Where such an API is available, the received search query may be provided to the third-party electronic marketplace via the API (Block 1068). Thereafter, search results from the third-party electronic marketplace may be received (e.g., via the API) (Block 1070). The prices of the search results may then be associated as price points with the received search query (Block 1072). Thereafter, the association between the prices of the search results and the received search query may be stored (Block 1074).

Figure 11:
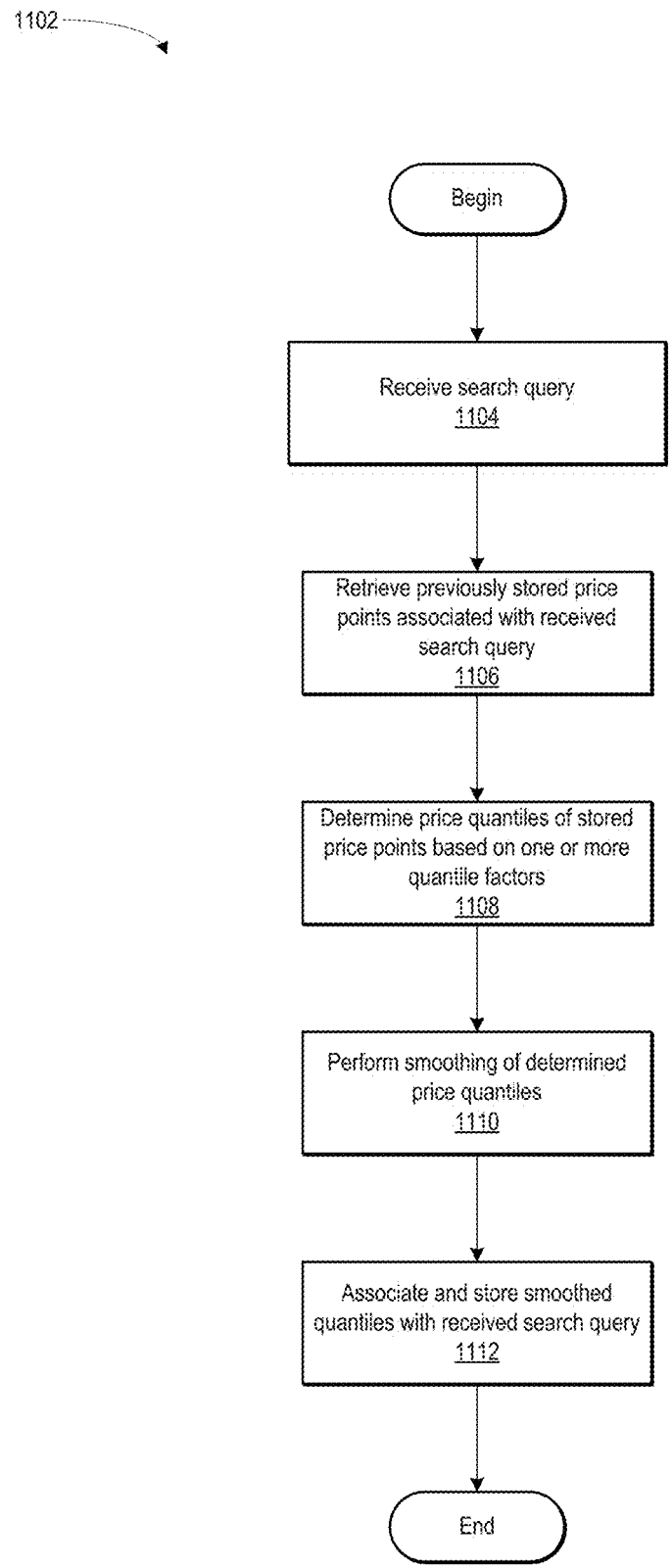
FIG. 11 illustrates an exemplary logic flow for determining price quantiles for various search queries according to aspects of the disclosure.

FIG. 11 illustrates an exemplary logic flow 1102 for determining price quantiles for various search queries according to aspects of the disclosure. In one embodiment, a search query may be received (Block 1104). The received search query may or may not be the same search query as shown in any one of FIGS. 10A-10E. Price points for the received search query may then be retrieved where such price points are available (Block 1106). In another embodiment, where such price points are not available, such price points may then be collected according to any one of the logic flows shown in FIGS. 10A-10E or combinations thereof. Using the aforementioned methods previously discussed, one or more price quantiles may then be determined based on the price points for the corresponding search query (Block 1108). If smoothing of the price quantiles is desired, one or more smoothing techniques may be employed to smooth the price quantiles (e.g., by making the price quantiles contiguous based on a currency multiplier) (Block 1110). The smoothed quantiles may then be associated and stored with the received search query (Block 1104).

Figure 12:
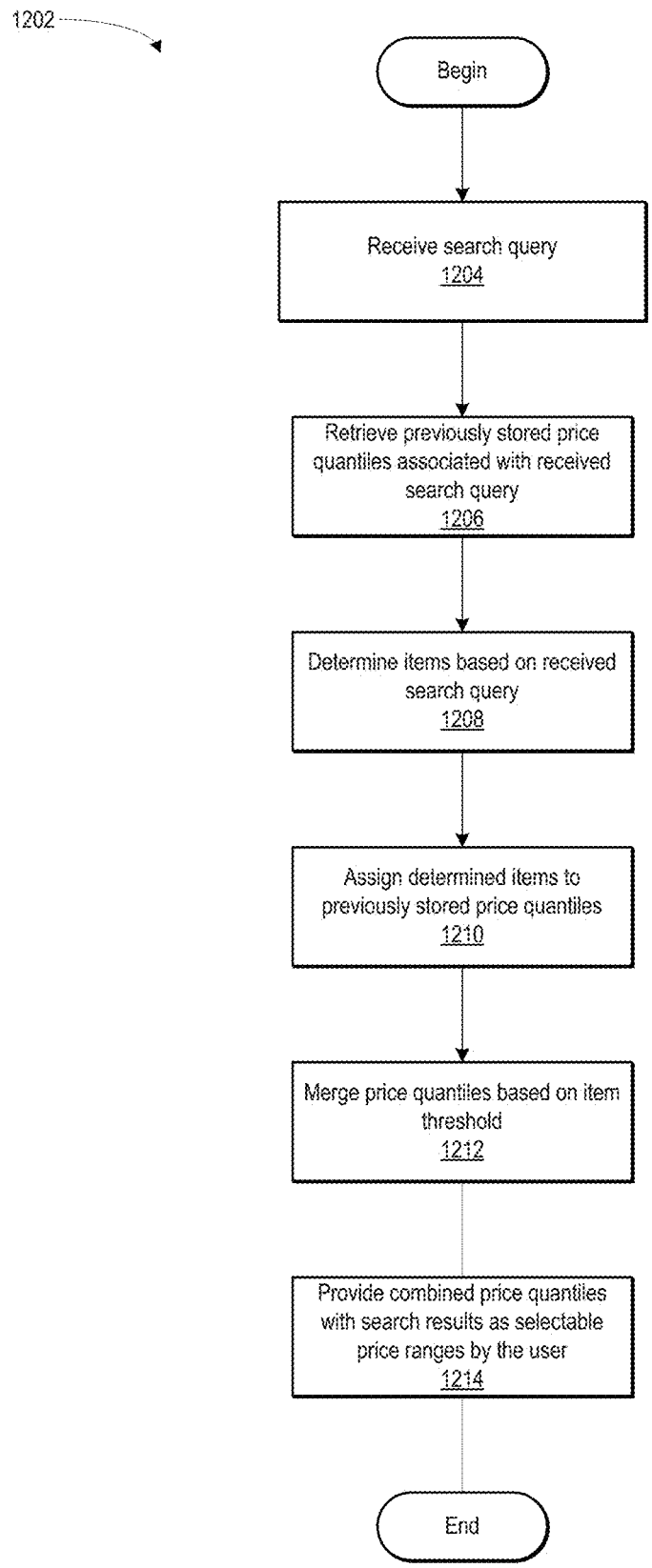
FIG. 12 illustrates an exemplary logic flow for displaying previously determined price quantiles according to aspects of the disclosure.

FIG. 12 illustrates an exemplary logic flow 1202 for displaying previously determined price quantiles according to aspects of the disclosure. In one embodiment, a search query may be received (Block 1204). The received search query may or may not be the same search query as shown in any one of FIGS. 10A-10E and FIG. 11. Price quantiles for the received search query may then be retrieved where such price quantiles are available (Block 1206). In another embodiment, where such price quantiles are not available, such price quantiles may then be collected according to the logic flow shown in FIG. 11. Items matching the received search query may then be determined (e.g., via the product listings search engine 520) (Block 1208). Thereafter, items matching the received search query may be assigned to a corresponding price quantile based on the price associated with the matching item (Block 1210). If an item threshold is employed, one or more of the determined price quantiles may be merged and/or combined to form a price range (Block 1212). The merged (or unmerged) price quantiles may then be provided to the user as selectable price ranges along with search results corresponding to the received search query (Block 1214).

In this manner, the disclosed systems and methods provide an advantageous mechanism by which a user may quickly review and identify item offerings having a price within a given price range. Furthermore, the disclosed systems and methods employ a variety of technical means (e.g., natural language processing, product search algorithms, comparison analyses, etc.) by which to provide this advantage. Thus, the disclosed systems and methods are an advancement in the art of providing goods and/or services through an electronic marketplace.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method comprising:
receiving, by a network interface from a client machine, a first search query for an item of a first electronic marketplace, wherein the first search query is received during a first session between the first electronic marketplace and the client machine;
communicating the first search query to an application programming interface of a second electronic marketplace, the second electronic marketplace accepting the first search query and providing second electronic marketplace search results in response, wherein the first electronic marketplace and the second electronic marketplace operate independently of each other;
determining a plurality of price quantiles for the first search query using prices of the second electronic marketplace search results; and
causing one or more price ranges to be displayed by the client machine, the one or more price ranges based on at least one price quantile from the plurality of price quantiles.

2. The method of claim 1, further comprising:
assigning a weighting factor to a first price based on whether a first item is an auction item or a fixed prices item,
wherein the weighting factor affects the price quantiles.

3. The method of claim 1, further comprising:
filtering a first plurality of search results using one or more filter values to determine a second plurality of search results;
wherein a first item is selected from the second plurality of search results.

4. The method of claim 1, further comprising:
filtering a first plurality of search results to determine a second plurality of search results by identifying each item of the first plurality of search results previously sold through the first electronic marketplace,
wherein a first item is selected from the second plurality of search results.

5. The method of claim 1, further comprising:
determining a first price from an application programming interface ("API") of a third electronic marketplace.

6. The method of claim 1, further comprising determining a first plurality of search results from a plurality of items of the first electronic marketplace based on the first search query.

7. The method of claim 6, further comprising determining that a number of offered items of the first plurality of search results corresponding to the first price quantile is less than an item threshold.

8. The method of claim 7, further comprising:
in response to a determination that a first number of offered items for the first price quantile is less than an item threshold, merging a first price quantile of the plurality of quantiles with a second price quantile of the plurality of price quantiles.

9. A system comprising:
one or more processors; and
memory including computer executable instructions that, upon execution by the one or more processors, cause the system to:
receive a first search query for an item of a first electronic marketplace, the first search query being received during a first session between the electronic marketplace and a client machine;
communicate the first search query to an application programming interface of a second electronic marketplace, the second electronic marketplace accepting the first search query and providing second electronic marketplace search results in response, wherein the first electronic marketplace and the second electronic marketplace operate independently of each other;
determine a plurality of price quantiles for the first search query using prices of the second electronic marketplace search results; and
cause one or more price ranges to be displayed by the client machine, the one or more price ranges based on at least one price quantile from the plurality of price quantiles.

10. The system of claim 9, wherein the instructions upon execution by the one or more processors further cause the system to:
assign a weighting factor to the prices of the second electronic marketplace search results based on whether a price of the prices of the second marketplace search results corresponds to an auction item or a fixed price item,
wherein the weighting factor affects the plurality of price quantiles.

11. The system of claim 9, wherein the instructions upon execution by the one or more processors further cause the system to:
filter a first plurality of search results using one or more filter values to determine a second plurality of search results,
wherein a first item is selected from the second plurality of search results.

12. The system of claim 9, wherein the instructions upon execution by the one or more processors further cause the system to:
filter a first plurality of search results to determine a second plurality of search results by identifying each item of the first plurality of search results previously sold through the electronic marketplace,
wherein a first item is selected from the second plurality of search results.

13. The system of claim 9, further cause the system to determine a first plurality of search results from a plurality of items of the first electronic marketplace based on the first search query.

14. The system of claim 13, further cause the system to determine that a number of offered items of the first plurality of search results corresponding to the first price quantile is less than an item threshold.

15. The system of claim 14, wherein the instructions upon execution by the one or more processors further cause the system to:
in response to a determination that a first number of offered items for the first price quantile is less than an item threshold, merge a first price quantile of the plurality of price quantiles with a second price quantile of the plurality of price quantiles.

16. A non-transitory machine-readable storage medium storing a set of instructions that, when executed by at least one processor, causes the at least one processor to perform a method, the method comprising:
receiving, by a network interface from a client machine, a first search query for an item of a first electronic marketplace, wherein the first search query is received during a first session between the first electronic marketplace and the client machine;
communicating the first search query to an application programming interface of a second electronic marketplace, the second electronic marketplace accepting the first search query and providing second electronic marketplace search results in response, wherein the first electronic marketplace and the second electronic marketplace operate independently of each other;
determining a plurality of price quantiles for the first search query using prices of the second electronic marketplace search results; and
causing one or more price ranges to be displayed by the client machine, the one or more price ranges based on at least one price quantile from the plurality of price quantiles.

17. The non-transitory, computer-readable medium of claim 16, wherein the method further comprises:
assigning a weighting factor to the prices of the second electronic marketplace search results based on whether a price of the prices of the second marketplace search results corresponds to an auction item or a fixed price item,
wherein the weighting factor affects the plurality of price quantiles.

18. The non-transitory, computer-readable medium of claim 16, further comprising determining a first plurality of search results from a plurality of items of the first electronic marketplace based on the first search query.

19. The non-transitory, computer-readable medium of claim 16, further comprising determining that a number of offered items of a first plurality of search results corresponding to the first price quantile is less than an item threshold.

20. The non-transitory, computer-readable medium of claim 19, further comprising merging a first price quantile of the plurality of price quantiles with a second price quantile of the plurality of price quantiles.

* * * * *